(12) United States Patent
Mizuno

(10) Patent No.: US 6,421,307 B2
(45) Date of Patent: Jul. 16, 2002

(54) OPTICAL DEVICE

(75) Inventor: Takeshi Mizuno, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/169,997

(22) Filed: Oct. 13, 1998

(30) Foreign Application Priority Data

Oct. 14, 1997 (JP) ............................................. 9-296194

(51) Int. Cl.⁷ ................................................. G11B 7/00
(52) U.S. Cl. ..................... 369/43; 369/112.28; 369/121; 369/53.28; 369/44.12
(58) Field of Search ................................. 369/112, 110, 369/109, 44.23, 44.42, 43, 44.27, 53.28, 44.12

(56) References Cited

U.S. PATENT DOCUMENTS

| | | | | |
|---|---|---|---|---|
| 5,541,906 A | * | 7/1996 | Kobayashi | 369/112 |
| 5,680,385 A | * | 10/1997 | Nagano | 369/112 |
| 5,793,732 A | * | 8/1998 | Sabert et al. | 369/112 |
| 5,835,472 A | * | 11/1998 | Horie et al. | 369/112 |
| 5,875,159 A | * | 2/1999 | Doi | 369/44.23 |
| 5,953,294 A | * | 9/1999 | Choi | 369/44.23 |
| 5,956,312 A | * | 9/1999 | Ishihara | 369/112 |

FOREIGN PATENT DOCUMENTS

EP    0 729 137 A2    8/1996

* cited by examiner

Primary Examiner—Nabil Hindi
(74) Attorney, Agent, or Firm—Sonnenschein, Nath & Rosenthal

(57) ABSTRACT

An optical device having an irradiated portion formed of an optical recording medium in which a pit is formed on a reflection surface, a semiconductor unit in which a semiconductor laser, a semiconductor structure and a photo-detection element are formed on the same semiconductor substrate, and a converging device for converging a light emitted from the semiconductor laser and irradiating the same of the irradiated portion and further converging a returned light reflected from the irradiated portion. The semiconductor structure is formed near the confocal of the converging device and includes at least three reflection surfaces. The photo-detection element includes a first detection element for receiving a returned light reflected on the second reflection surface and a second detection element for receiving the returned light reflected on the third reflection surface. A first detection signal which results from detecting a diffracted light from one pit edge of the pit by the first detection element and a second detection signal which results from detecting the diffracted light from one pit edge of the pit by the second detection element are obtained. The first and second detection signals are computed to generate a tracking error signal.

18 Claims, 21 Drawing Sheets

Groove or Pit

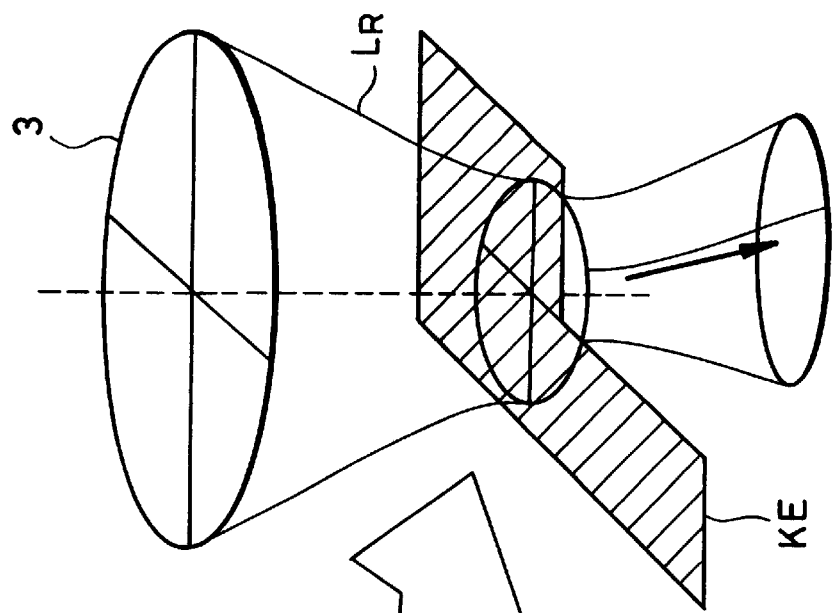
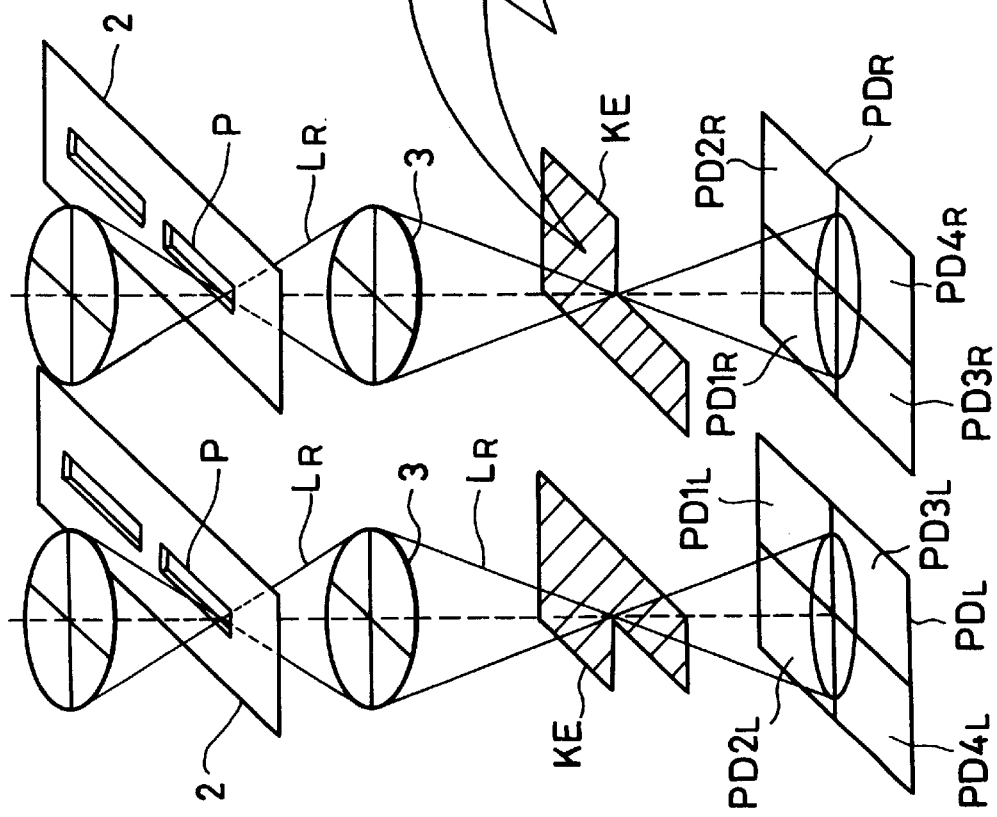
FIG. 11B
FIG. 11A

A,B(−1,+1)  G,H(0,+1)  M,N(+1,+1)
C,D(−1,0)   I,J(0,0)   O,P(+1, 0)
E,F(−1,−1)  K,L(0,−1)  Q,R(+1,−1)

A

B

C

D

E

F

OPTICAL DEVICE

BACKGROUND OF THE INVENTION

1. Field of the Invention

The present invention relates to an optical device for use in receiving and detecting a returned light reflected from an irradiated portion by irradiating a light from a light-emitting portion, for example, on the irradiated portion of an optical recording medium such as an optical disk, a phase-change type optical disk and so on, and particularly to an optical device for use in detecting a tracking error signal relative to an optical disk having a pit depth$\lambda/4n$ or a recording portion equivalent thereto.

2. Description of the Related Art

In optical devices such as an optical pickup of an optical disk drive of a so-called compact disc (CD) player and a magnetooptical disk drive, respective optical assemblies such as a grating, a beam splitter and so on are individually fabricated so that an overall arrangement of a device becomes complicated and large. Moreover, when optical assemblies are fabricated on a base in a hybrid fashion, optical assemblies should be disposed with a strict alignment accuracy.

FIG. 1 is a structural diagram showing an example of a conventional optical pickup 81 that is exclusively used for reproducing a compact disc (CD). This optical pickup 81 comprises a semiconductor laser 82, a diffraction grating 83, a beam splitter plate 84, an objective lens 85 and a light-receiving element 86 composed of a photo-diode. A laser light L from the semiconductor laser 82 is reflected on the beam splitter plate 84, converged by the objective lens 85 and thereby irradiated on an optical disk 90. A returned light reflected on the optical disk 90 is traveled through the objective lens 85 and the beam splitter plate 84 and received and detected by the light-receiving element 86.

However, such optical pickup 81 has not only many assemblies and become very large in size but also many assemblies thereof should be disposed with a high accuracy so that its productivity is low accordingly.

As a tracking servo method in an optical device such as an optical pickup or the like, there are generally used a push-pull method, a 3-beam method, a heterodyne method and the like.

Of these methods, according to the conventional push-pull method, when a beam spot of incident light on a disc is displaced from a track or a pit, a difference of intensity occurs in +first-order light and −first-order light, whereby a far field pattern (FFP) becomes asymmetric. Then, two photo-detectors, for example, detect signals corresponding to the asymmetric far field pattern, and a computing device computes these signals to detect a displacement of a beam spot (see FIG. 2).

FIGS. 2A and 2B are each a schematic structural diagram showing a tracking servo using a push-pull method.

As shown in FIG. 2B, when a light is irradiated on concavities and convexities of pits formed on the surface of a disk 52, the concavities and the convexities diffract the light to provide a 0-order diffracted light (main beam B) and ±first-order diffracted lights (sub-beams B').

In FIG. 2B, reference numerals $S_0$, $S_1$ denote irradiated spots of the 0-order diffracted light and the ±first-order diffracted lights, respectively. The irradiated spot $S_0$ becomes circular because of an aperture of an objective lens.

In this case, as shown in FIG. 2A, two split photo-diodes $PD_R$, $PD_L$ are disposed as a light-receiving unit. Lights received by these photo-diodes PDR, PDL are computed by a suitable device such as a differential amplifier or the like, not shown, like ($PD_L - PD_R$), for example, to thereby obtain a tracking error signal TE as a tracking signal.

When the track and the center axis of incident beam are shifted from each other, there is caused a difference in diffracted information between ±first-order diffracted lights, so that TE=($PD_L - PD_R$) does not become zero but indicates a positive or negative value in response to the shifted direction. Thus, it is possible to detect the direction and the amount in which the center axis of the incident beam is shifted from the track.

Although the tracking servo system using the push-pull method may be realized by the two split photo-diodes and may be made inexpensive, there arises a problem that, when the lens is shifted, the returned light from the disk is vertically shifted on the light-receiving surface with respect to the split line of the light-receiving element, thereby resulting in a large offset being generated in the signal.

As shown in FIG. 3A, when a lens 51 is shifted in the lateral direction, spots of lights received by the photo-diodes PDL, PDR are shifted as shown by dashed line concurrently therewith. Thus, even when the tracking is properly made, the tracking error signal TE=0 is not satisfied.

Also, as shown in FIG. 3B, when the lens 51 is skewed relative to the disk 52, spots of received lights are also shifted as shown by dashed lines. Thus, even when the tracking is properly made, the tracking error signal TE=0 is not satisfied.

FIG. 4 shows measured results of influences exerted upon the tracking error signal by the lens shift in the case of the conventional push-pull signal as described above. Incidentally, the vertical axis represents measured results in the form of a relative value. Influences were computed by using a disk such that a groove pitch was 1.60 $\mu$m, a groove depth (depth) was wavelength/8 and a duty (duty:groove ratio) was 65%. Also, a wavelength was 0.78 $\mu$m.

A study of FIG. 4 revealed that, according to the conventional push-pull signal, when the lens is shifted, the whole of the tracking error signal also is shifted concurrently therewith.

According to the push-pull method, when a wavelength of reproducing laser is $\lambda$ and a refractive index of the transparent base of the disk 52 is n, if a depth of pits on the disk 52 is $\lambda/4n$, then a signal due to interference between the 0-order diffracted light and ±first-order diffracted lights becomes zero. As a consequence, it becomes impossible to detect the tracking error signal from a principle standpoint. Accordingly, the push-pull method may not be applied to the standardized disk 52 in which the pit depth is $\lambda/4n$.

For example, a DVD (Dedital Versatile Disk)-ROM and a DVD-Video have the pit depth of $\lambda/4n$ according to the standards, so that the push-pull method may not be applied to such disks.

According to the three-beam method, the diffraction grating separates a light to provide a main beam and two sub-beams on both sides of the main beam. FIG. 5 shows positions of spots formed on the disk surface according to the three-beam method. As illustrated, reflected beams of two sub-beams are respectively detected by irradiating a spot $S_0$ based on the main beam and spots $S_1$, $S_2$ based on the sub-beams on both sides of the main beam on the grooves or pits of the disk 52 and a difference signal is calculated, thereby effecting a tracking servo similar to that of the push-pull method.

When the spot $S_0$ of the main beam is shifted from the center of the track, the reflected lights based on the spots $S_1$, $S_2$ of the sub-beams become asymmetrical so that the tracking error signal provided by the difference signal is fluctuated from zero. Since the fluctuated amount of this tracking error signal changes in accordance with the amount in which the spot $S_0$ of the main beam is shifted from the center of the track, there may be effected the tracking servo.

Incidentally, the reflected light of the main beam is used to detect a disk recording signal.

Although the three-beam method may cope with the above-mentioned lens shift, the three-beam method has the drawback such that the light should travel through the diffraction grating such as a grating or the like, causing the number of assemblies to increase, an amount of light of the main beam decreases, causing a power consumption to increase, an adjustment is complicated, requiring much manufacturing cost and so on.

Further, as a method which is effective for the tracking servo of the standardized disk in which the pit depth is $\lambda/4n$, there is known a phase difference detection method.

The phase difference detection method is realized by a method of detecting a diffraction spectrum of a two-dimensional pit by heterodyning with reference to an RF (higher harmonic wave) signal or a method of digitally computing each signal detected on the photo-detector.

According to the phase difference detection method, as shown in FIG. 6, for example, quadrant photo-diodes $PD_1$, $PD_2$, $PD_3$, $PD_4$ are formed about the optical axis with respect to the tangential direction T of the pit series direction, for example, of the optical disk serving as the irradiated portion and the direction perpendicular to this direction T, and located in the far field region. Then, a returned light from the optical disk is detected by the quadrant photo-diodes $PD_1$ to $PD_4$.

In FIG. 6, a center circle corresponds to the pupil of the lens, and is equivalent to the spot of the 0-order diffracted light. Other eight circles surrounding the center circle are equivalent to the spots of the first-order diffracted light. Also, a central dashed-line block is an image corresponding to the pit P on the disk.

Then, with respect to the arrangement of the quadrant photo-diodes $PD_1$ to $PD_4$, the following signal processing will be executed, for example.

An RF signal $(PD_1+PD_2+PD_3+PD_4)$, which is the sum total of the detection signals of the respective photo-diodes and a signal (e.g. $PD_1+PD_3-PD_2-PD_4$) which results from computing the detection signals of the respective photo-diodes are detected by heterodyning, taking a phase into a consideration.

A content of a computed signal obtained at that time is shown by the Expression (1):

$$\text{Computed signal} = (PD_1 + PD_3) - (PD_2 + PD_4) \quad (1)$$
$$= C \sin(2\pi v_t / v_p)\sin(2\pi a\omega t / v_p)$$

where
$V_t$: detrack amount
$v_p$: cycle of pit series
a: radius of read-out position
ω: angular velocity of optical disk
C: constant Having considered that RF signal $(PD_1+PD_2+PD_3+PD_4)$ is $\cos(2\pi a\omega t/v_p)$, $C\sin(2\pi v_t/v_p)$ on the equation (1) becomes a signal which results from detecting the computing signal by heterodyning with reference to this phase. The detrack amount $v_t$ may be computed from the signal which was obtained by heterodyning in this way.

In this case, the tracking signal is made difficult to offset by the lens shift. Also, this method is effective for the standardized disk in which the pit depth is $\lambda/4n$.

On the other hand, in order to improve the defects encountered with the above-mentioned conventional optical device, there has hitherto been a so-called CLC (confocal laser coupler) in which optical assemblies may be reduced and an alignment with which optical assemblies are located may be simplified and in which a light-emitting unit is located at a confocal position of a converging means such as a lens or the like and a light-receiving unit is formed near the confocal position at which this light-emitting unit is located in order to simplify and miniaturize the overall arrangement of the device.

In order to remove the offset caused in the tracking error signal by the aforementioned lens shift and the disk skew, the assignee of the present application has previously proposed an optical device in which split photo-diodes forming a light-receiving unit are disposed at the above-mentioned confocal position and in which these split photo-diodes execute the tracking servo by using a push-pull method or the like (see "OPTICAL DEVICE" described in Japanese patent application No. 7-35528).

According to such an optical device, since the tracking error signal is detected by the push-pull method (CPP method) based on the light-receiving unit located near the confocal position, the tracking error signal may be detected stably against the lens offset and the disk skew and the alignment required in the assembly may be simplified considerably. Moreover, since the light-emitting unit and the light-receiving unit are formed on the same base, the number of assemblies may be reduced, a manufacturing cost may be reduced, and the optical device may be made highly reliable.

However, the above-mentioned CPP method has the defect inherent in the confocal optical system.

In particular, this defect directly becomes remarkable when an image is not properly focused and is very slightly defocused in the amount approximately within a focal depth.

FIG. 7 shows its example. FIG. 7 shows an example of numerically-computed results and explains a relationship between a tracking error signal and a detrack amount obtained by the CPP method when an image is defocused. An optical disk used is of the disk of the same shape that was used in the computation of FIG. 4.

A study of FIG. 7 reveals that, even when a defocus (generally, a term "defocus" is not used within the focal depth but used for convenience' sake) of less than ±1 μm, e.g. approximately the same amount obtained within the focal depth or defocus within the focal depth occurs, the tracking error detection based on the CPP method causes an error.

Moreover, as in the case in which defocus=−0.50 μm is obtained as shown by a curve G in FIG. 7, there are generated a signal having a frequency different from that of an original tracking error signal (defocus=0.00 μm shown by a curve E) or other tracking error signals, e.g. tracking error signal having a double frequency. Also, it should be noted that polarities of the signals are inverted as shown by curves H and I.

On the other hand, the optical system for the optical disk requires the focusing control as well as the tracking control when a signal is recorded/reproduced. In general, when a focusing is controlled, a defocusing amount is suppressed to become approximately less than a focal depth of an objective lens by a suitable method such as a spot size method, an astigmatism method, a knife edge method or the like. However, the defocus amount is not constantly eliminated to 0 µm and is incessantly fine fluctuated within the focal depth. Accordingly, when a tracking error is detected by the CPP method, before discussing the pit depth, there should be adopted a correction method or a detection method which considers the influence of defocusing.

SUMMARY OF THE INVENTION

In view of the aforesaid aspect, according to the present invention, there is provided an optical device such as an optical pickup in which the number of optical assemblies may be reduced or the like, an alignment required when optical assemblies are disposed may be simplified, the overall arrangement of the device may be simplified and miniaturized, a tracking signal such as a tracking error signal or the like may be obtained stably for optical recording media having various pit depths and which may be manufactured with ease by a semiconductor process.

An optical device according to the present invention includes an irradiated portion composed of an optical recording medium in which pits are formed on a reflection surface, a semiconductor unit in which a semiconductor laser, a semiconductor structure comprised of a plurality of reflection surfaces and a photo-detecting element are formed on the same semiconductor substrate, and a converging a means for converging a light emitted from the semiconductor laser and irradiating the same on the irradiated portion and which further converges a returned light reflected from the irradiated portion. The semiconductor structure comprises at least a first reflection surface for reflecting the light from the semiconductor laser, and second and third reflection surfaces for irradiating a part of returned light from the converging means on the photo-detecting element. The first, second and third reflection surfaces of the semiconductor structure are formed near the confocal of the converging means. Also, the photo-detecting element comprises a first detecting element for receiving a returned light reflected on the second reflection surface and a second detecting element for receiving a returned light reflected on the third reflection surface in which a first detection signal is obtained by detecting a diffracted light from one pit edge of the pit formed on the optical recording medium by the first detecting element and a second detection signal is obtained by detecting the diffracted light by the second detecting element, and a tracking error signal is obtained by computing the first and second detection signals.

According to the above-mentioned arrangement of the present invention, since the first detection signal is obtained from the diffracted light from one pit edge of the pit formed on the optical recording medium by the first detecting element and the second detection signal is obtained from the diffracted light by the second detecting element and the tracking error signal is obtained by computing the first and second detection signals, it is possible to detect a tracking error signal which may satisfactorily cope with the standardized disk in which the pit depth is λ/4n. Also, there may be obtained a tracking error signal which is difficult to be affected by the lens shift and the defocusing.

Further, since the semiconductor laser, the reflection surfaces and the photo-detecting element are formed on the same semiconductor substrate, the optical device may be formed by few assemblies, simplified and miniaturized.

An optical device according to the present invention comprises an irradiated portion formed of an optical recording medium in which pits are formed on a reflection surface, a semiconductor unit in which a semiconductor laser, a semiconductor structure composed of a plurality of reflection surfaces and a photo-detector element are formed on the same semiconductor substrate, and a converging means for converging a light emitted from the semiconductor laser, irradiating the same on the irradiated portion and further converging a returned light reflected from the irradiated portion, wherein the semiconductor structure comprises at least a first reflection surface for reflecting a light emitted from the semiconductor laser and second and third reflection surfaces for irradiating a part of a returned light from the converging means on the photo-detector element, the first, second and third reflection surfaces of the semiconductor structure are formed near a confocal of the converging means, the photo-detector element comprises a first detection element for receiving the returned light reflected on the second reflection surface and a second detection element for receiving the returned light reflected on the third reflection surface, the first detection element detects a first detection signal from a diffracted light obtained from one pit edge of the pits formed on the optical recording medium, the second detection element detects a second detection signal from the diffracted light, and the first detection signal and the second detection signal are computed to generate a tracking error signal.

According to the present invention, in the above-described optical device, the first reflection surface, the second reflection surface and the third reflection surface of the semiconductor structure are each formed of a predetermined crystal plane grown on the semiconductor substrate as a crystal.

According to the present invention, in the above-described optical device, the semiconductor structure is shaped as a triangular pyramid comprising the first reflection surface, the second reflection surface and the third reflection surface.

According to the present invention, in the above-described optical device, the first photo-detection element and the second photo-detection element are quadrant photo-detection elements.

According to the present invention, in the optical device, the semiconductor substrate has a concave portion of a predetermined depth retreated from the substrate surface of the semiconductor substrate at its portion in which the semiconductor laser is formed and the photo-detection element is formed in the concave portion.

BRIEF DESCRIPTION OF THE DRAWINGS

FIGS. 3A and 3B are each diagram used to explain problems encountered with the push-pull method, in which FIG. 3A is a diagram showing an offset obtained when the lens is shifted, and FIG. 3B is a diagram B showing an offset obtained when the lens is skewed;

FIGS. 11A and 11B are respectively diagrams showing models of optical system used in the calculation;

FIG. 17 shows characteristics of a tracking error signal obtained in the case of the CKE arrangement, in which

DESCRIPTION OF THE PREFERRED EMBODIMENTS

An optical device according to the embodiments of the present invention will hereinafter be described with reference to the drawings.

Figure 1:
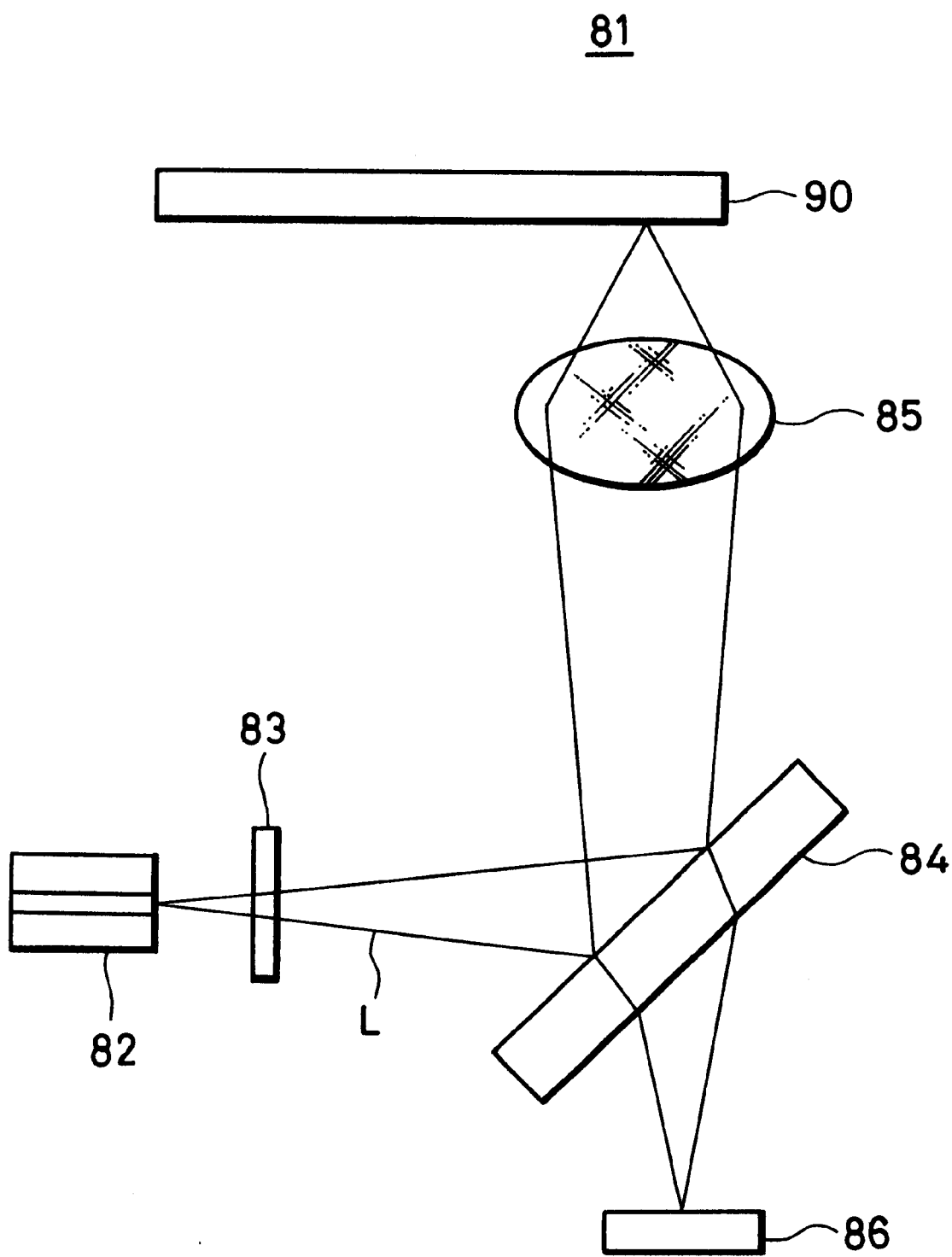
FIG. 1 is a schematic diagram of a conventional optical device.
Figure 2A:
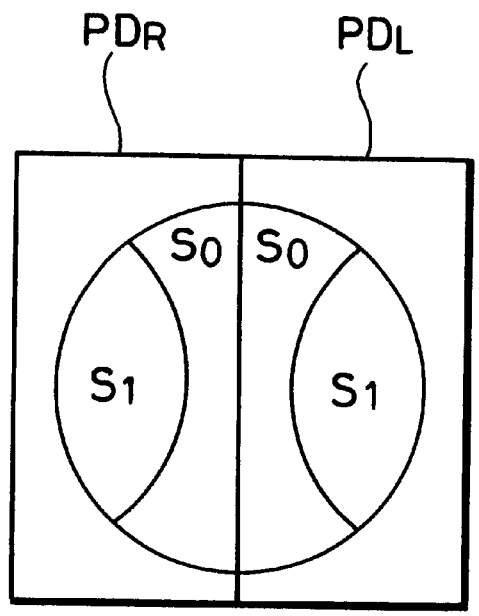
FIGS. 2A and 2B are each a diagram used to explain the tracking servo based on the push-pull method.
Figure 2B:
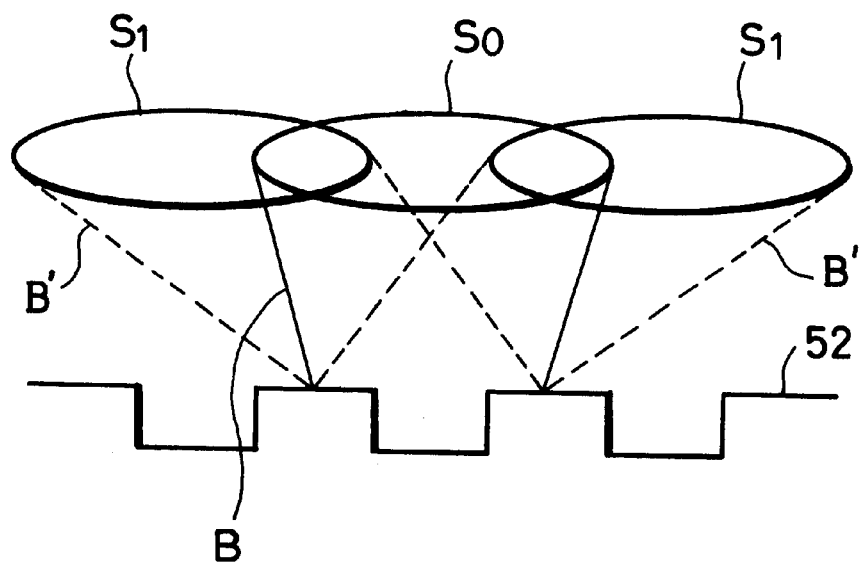
Figure 3A:
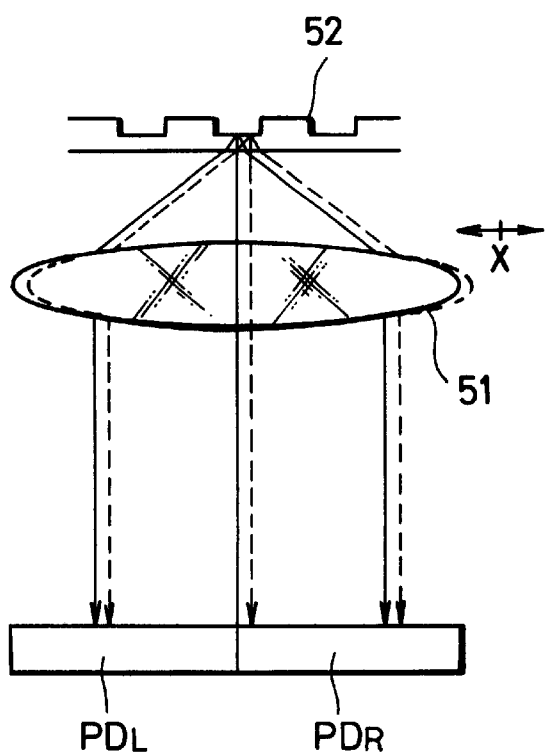
Figure 3B:
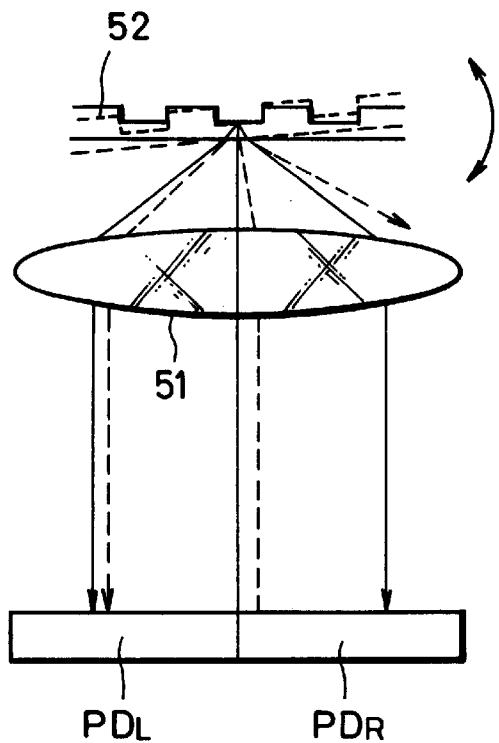
Figure 4:
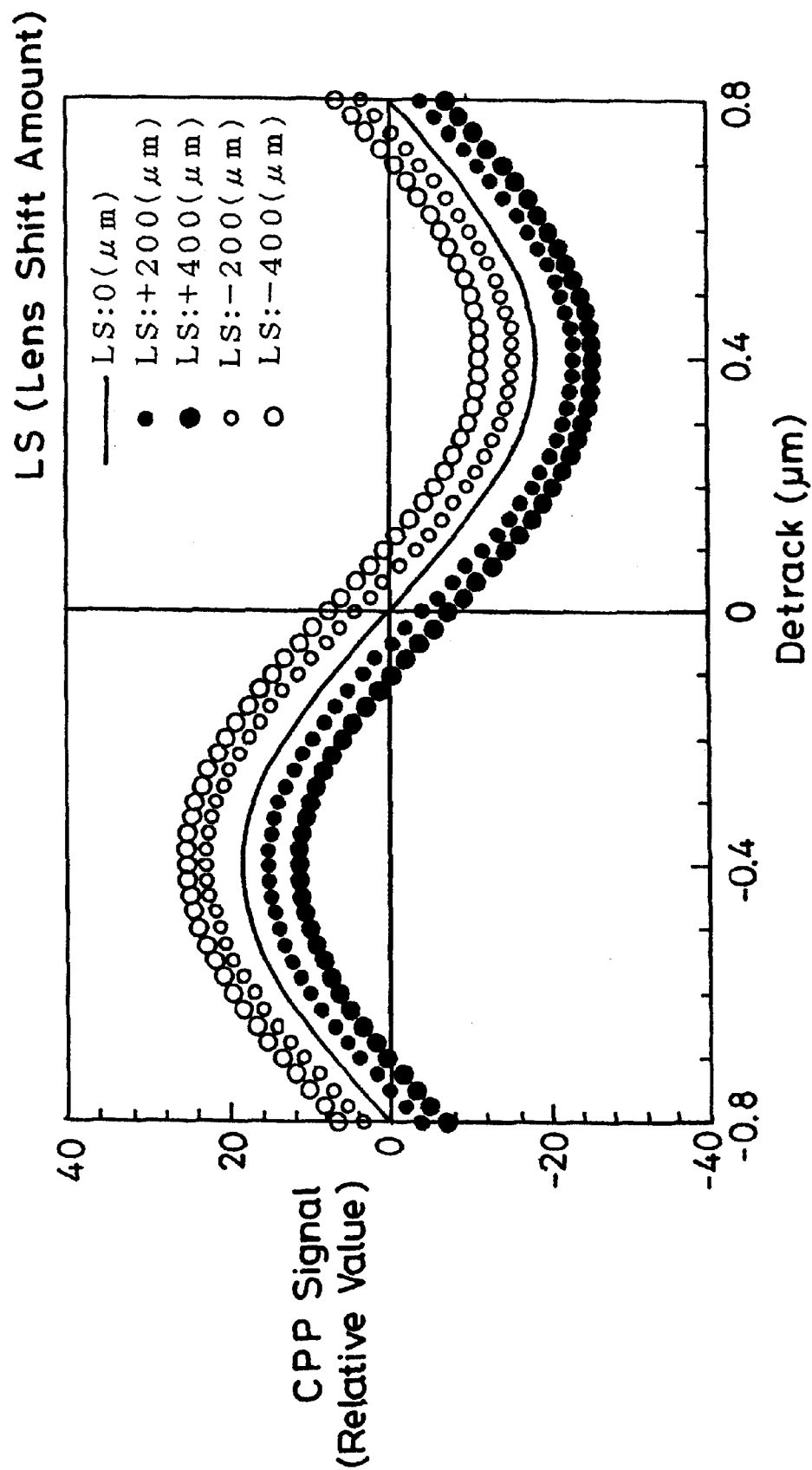
FIG. 4 is a graph showing the tracking error signal detected by the conventional push-pull method.
Figure 5:
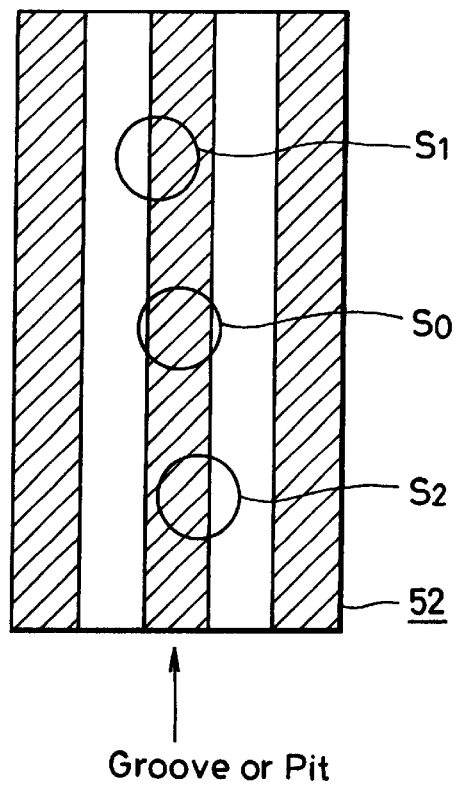
FIG. 5 is a diagram used to explain the tracking servo based on the 3-spot method.
Figure 6:
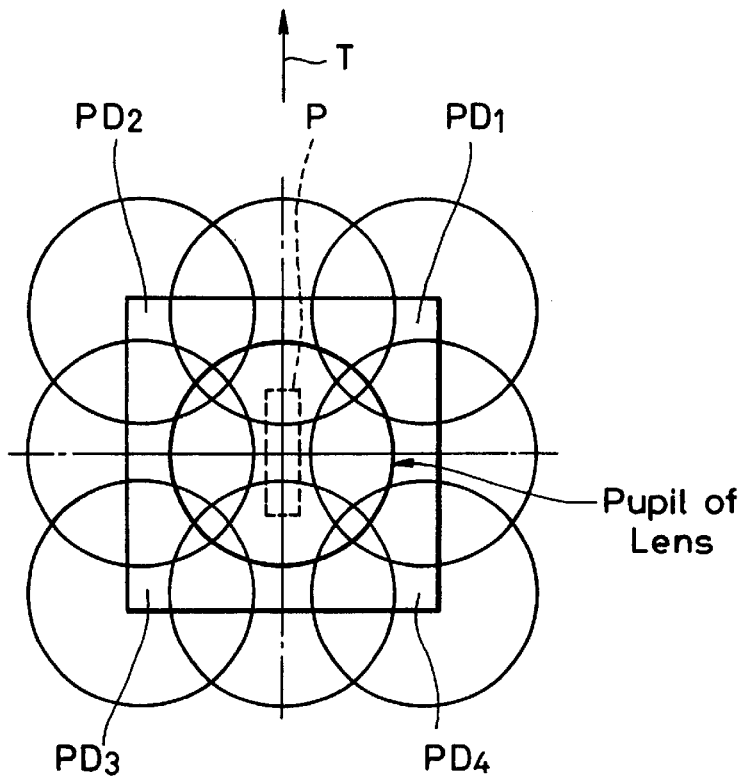
FIG. 6 is a diagram used to explain the tracking servo based on the phase difference detection method.
Figure 7:
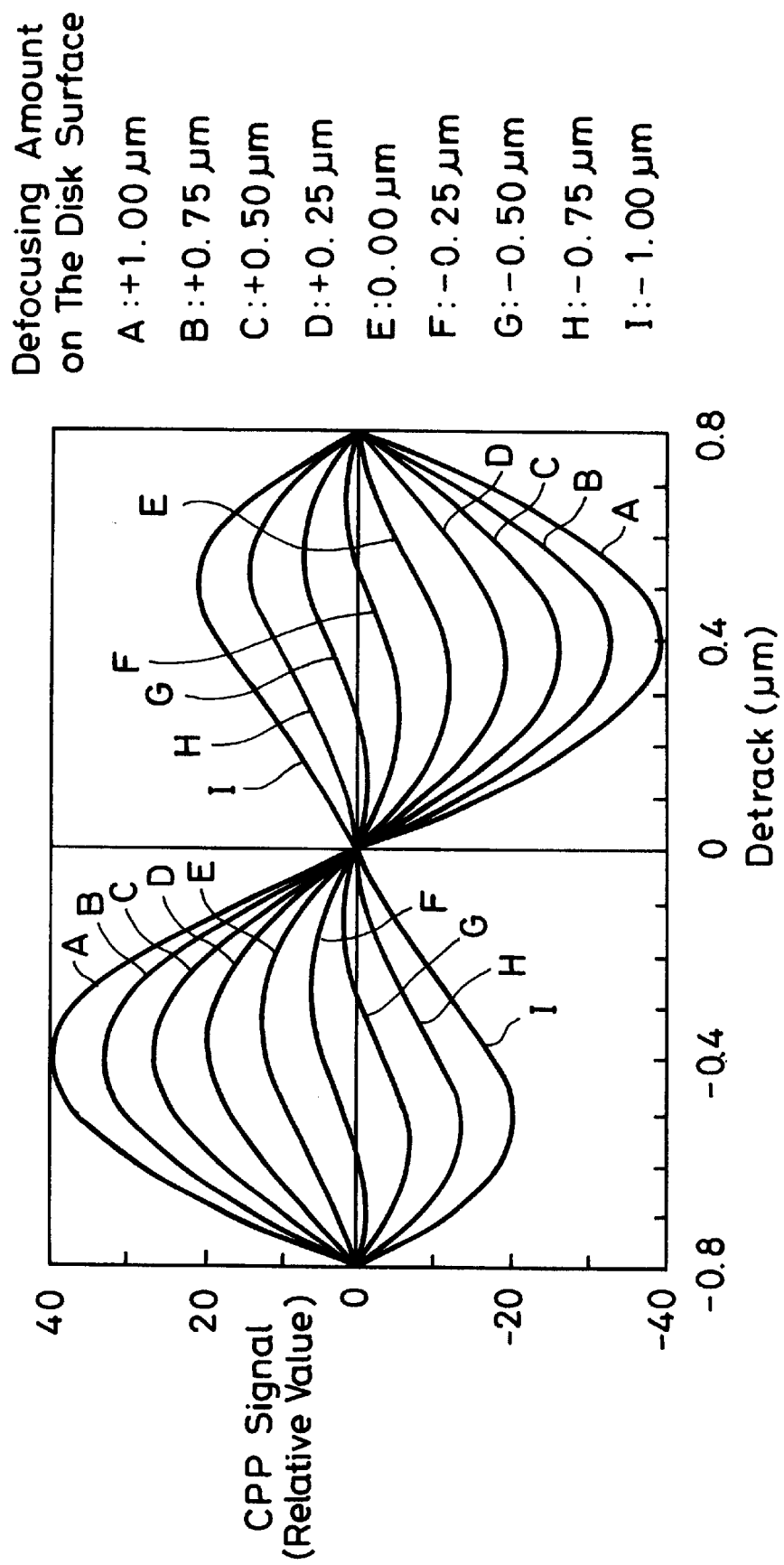
FIG. 7 is a graph showing a relationship between the tracking error signal and the defocusing amount according to the CPP method.
Figure 8:
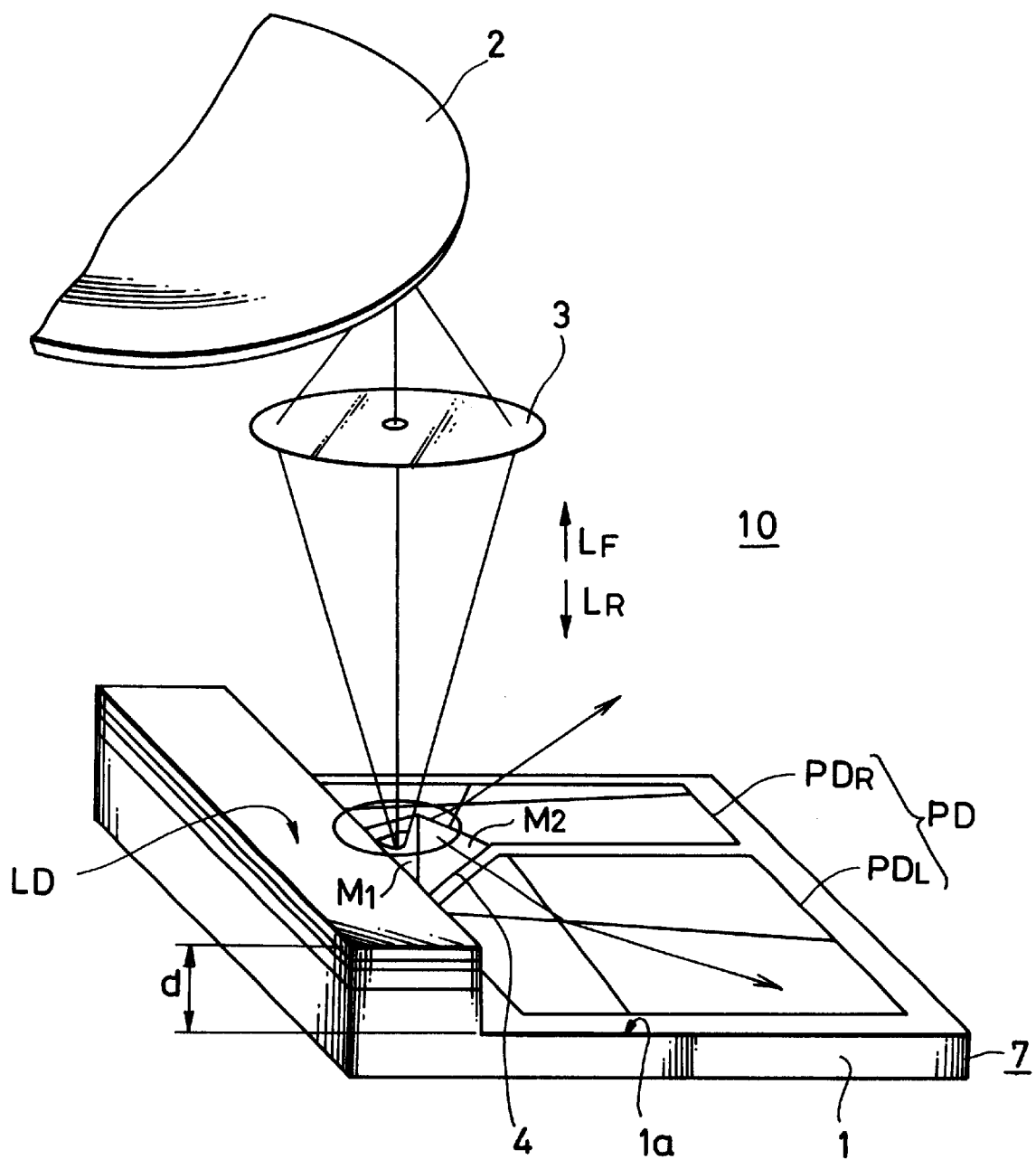
FIG. 8 is a schematic structural diagram (perspective view) of an optical device according to an embodiment of the present invention.

FIG. 8 is a perspective view showing an optical device. According to this embodiment, an irradiated portion is an optical disk 2 having recording pits, for example. The present invention is applied to an optical pickup which is adapted to read out recorded information by irradiating a laser beam on this optical disk 2.

Figure 9B:
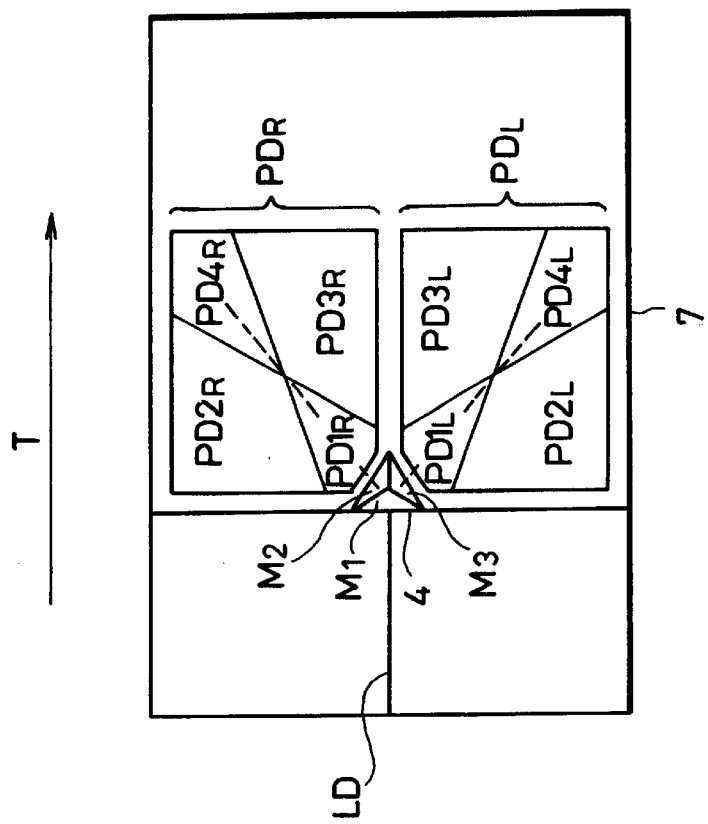
FIG. 9B is a plan view of the optical device shown in FIG. 8.
Figure 9A:
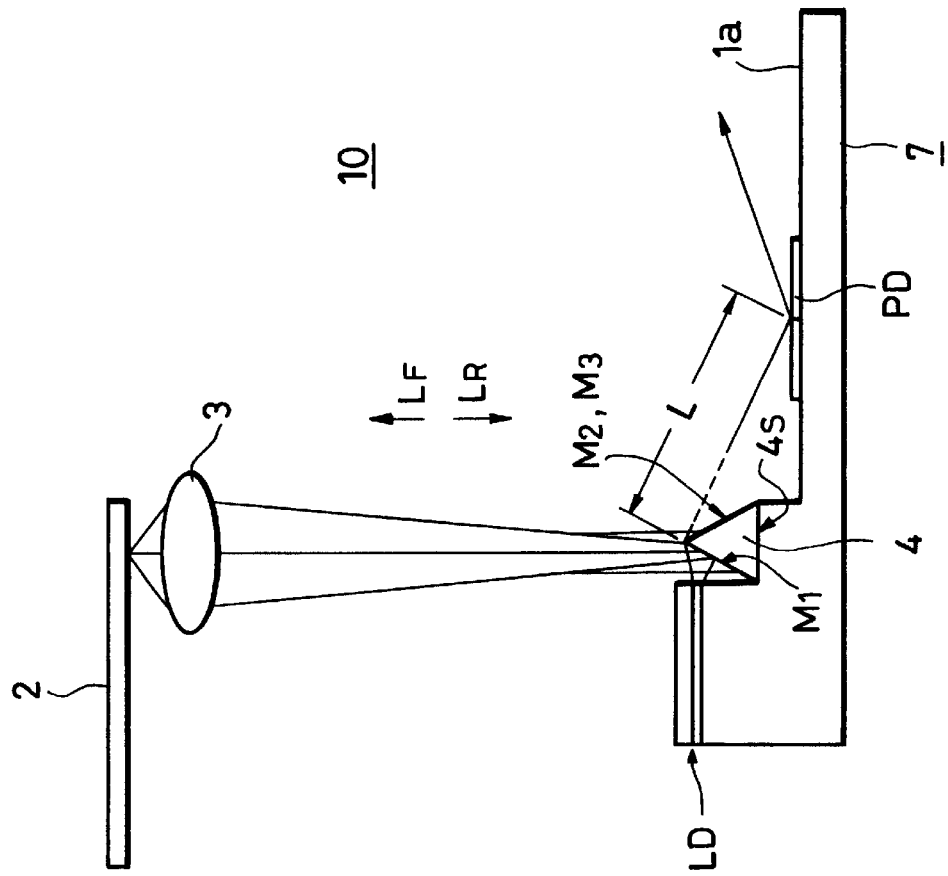
FIG. 9A is a side view of the optical device shown in FIG. 8.

FIG. 9A is a side view of an optical device, and FIG. 9B is a plan view thereof.

An optical device 10 is formed of an optical semiconductor element 7 which comprises a semiconductor laser LD having a resonator length direction extended along the substrate surface of a semiconductor substrate 1 and which is made parallel to the tangential direction T, for example, of an optical disk 2 serving an irradiated portion, a semiconductor structure 4 of a triangular pyramid shape opposed to one light-emitting end face of this semiconductor laser LD and which includes a reflection surface $M_1$ for reflecting a light $L_F$ emitted from the semiconductor laser LD, i.e. three reflection surfaces $M_1$, $M_2$, $M_3$ and a photo-detecting element comprising two quadrant photo-diodes $PD_R$ ($PD_{1R}$, $PD_{2R}$, $PD_{3R}$, $PD_{4R}$) and $PD_L$ ($PD_{1L}$, $PD_{2L}$, $PD_{3L}$, $PD_{4L}$) as light-receiving elements which are formed on the same semiconductor substrate.

This optical semiconductor element 7 may be manufactured in a series of semiconductor manufacturing processes by a so-called wafer batch process in which a plurality of optical semiconductor elements 7 are simultaneously formed on a wafer.

Also, the two quadrant photo-diodes $PD_R$, $PD_L$ are of substantially quadrant shapes divided by two splitting lines which are crossing each other.

The emitted light LF reflected on the reflection surface $M_1$ is converged and irradiated on the optical disk 2 by an objective lens 3 serving as a converging means. A returned light $L_R$ reflected from the optical disk 2 is converged by the common objective lens 3 and returned to the optical semiconductor element 7.

The returned light $L_R$ is converged by the objective lens 3 near an optical diffraction limit (i.e. diffraction limit of lens). When this optical diffraction limit, i.e. a wavelength of the light $L_F$ emitted from the semiconductor laser LD is $\lambda$ and a numerical aperture of the objective lens 3 on the side of optical device 10 is N. A., the diameter of the returned light $L_R$ on the focal plane and near the same becomes about 1.22 $\lambda$/N. For example, when the numerical aperture N. A. of the objective lens 3 is in a range of from 0.09 to 0.1, for example, and the wavelength $\lambda$ of the emitted light $L_F$ is approximately 780 nm, the diffraction limit becomes approximately 1.22 $\lambda$/N.A.≈10 $\mu$m.

The semiconductor structure 4 of the triangular pyramid shape comprises the reflection surface $M_1$ formed of a predetermined crystal plane grown on the optical semiconductor element 7, e.g. a {111} B crystal plane and two reflection surfaces $M_2$, $M_3$ formed of a {110} crystal plane, for example, and is located near the confocal of the objective lens 3 concerning the aforementioned returned light $L_R$. This semiconductor structure is of a so-called CLC (confocal laser coupler) arrangement in which a light-emitting unit is disposed at the confocal position of a converging means such as a lens and a light-receiving unit is formed near the confocal position at which this light-emitting unit is disposed.

In this case, under the ordinary growing condition, since the crystal growth is automatically stopped after the semiconductor structure 4 of the triangular pyramid shape was grown, a reproducibility of manufacturing process is excellent.

Then, a part of returned light $L_R$ is reflected by the two reflection surfaces $M_2$, $M_3$ different from one reflection surface $M_1$ of the semiconductor structure 4 of the triangular pyramid shape which reflected the emitted light $L_F$ and then irradiated on the right-hand side quadrant photo-diodes $PD_R$ ($PD_{1R}$, $PD_{2R}$, $PD_{3R}$, $PD_{4R}$) serving as the first detection element and the left-hand side quadrant photo-diodes $PD_L$ ($PD_{1L}$, $PD_{2L}$, $PD_{3L}$, $PD_{4L}$) serving as the second detection element.

These two quadrant photo-diodes $PD_R$, $PD_L$ are disposed at the opposite side of the vertex of the semiconductor structure of the triangular pyramid shape while sandwiching the reflectors $M_2$, $M_3$ and formed on a concave portion 1a retreated from the surface of the semiconductor substrate 1 at its portion in which the semiconductor laser LD is formed.

At that time, in the confocal optical system comprising the CLC arrangement, all rays of light diffracted near the focus position, i.e. diffracted lights formed of 0-order light and ±first-order lights are all overlapping with each other while they have distributions within the same plane on the confocal. Thus, even when a part of returned light is cut-out as in the case of this embodiment, all diffracted components are all propagated in a direction in which there exist the quadrant photo-diodes PD ($PD_R$, $PD_L$).

In this case, in order to spatially separate the respective overlapping interference components one more time, they should be propagated in a certain long distance. As shown in FIG. 8, the quadrant photo-diodes $PD_R$, $PD_L$ are formed in the concave portion 1a of the semiconductor substrate 1 retreated from the surface of the optical semiconductor element 7 at its portion in which the semiconductor laser LD is formed, i.e. the upper surface of the semiconductor laser LD retreated by a distance d, whereby a propagation distance L of the returned light $L_R$ from the semiconductor structure 4 of the triangular pyramid shape to the quadrant photo-diodes $PD_R$, $PD_L$ is obtained. Thus, it is possible to satisfactorily separate the diffracted pattern of the returned light $L_R$.

Then, since the returned light $L_R$ from the optical disk 2 is irradiated on the quadrant photo-diodes $PD_R$, $PD_L$, it is possible to detect the tracking error signal or the like by effecting a computation on the signal obtained from each of the quadrant photo-diodes $PD_{1R}$ to $PD_{4R}$ and $PD_{1L}$ to $PD_{4L}$.

Also, it is possible to read out recorded information from the optical disk, i.e. to detect the RF signal by the whole of the quadrant photo-diodes $PD_{1R}$ to $PD_{4R}$ and $PD_{1L}$ to $PD_{4L}$.

By the way, since the interference pattern changes considerably depending upon the propagation distance, the number and pattern of the split PDs and the computation method should be changed in response to respective values obtained when a device is designed.

This point and the computation method in the above-mentioned embodiment of the present invention shown in FIG. 8 will be described hereinafter.

Figure 10A:
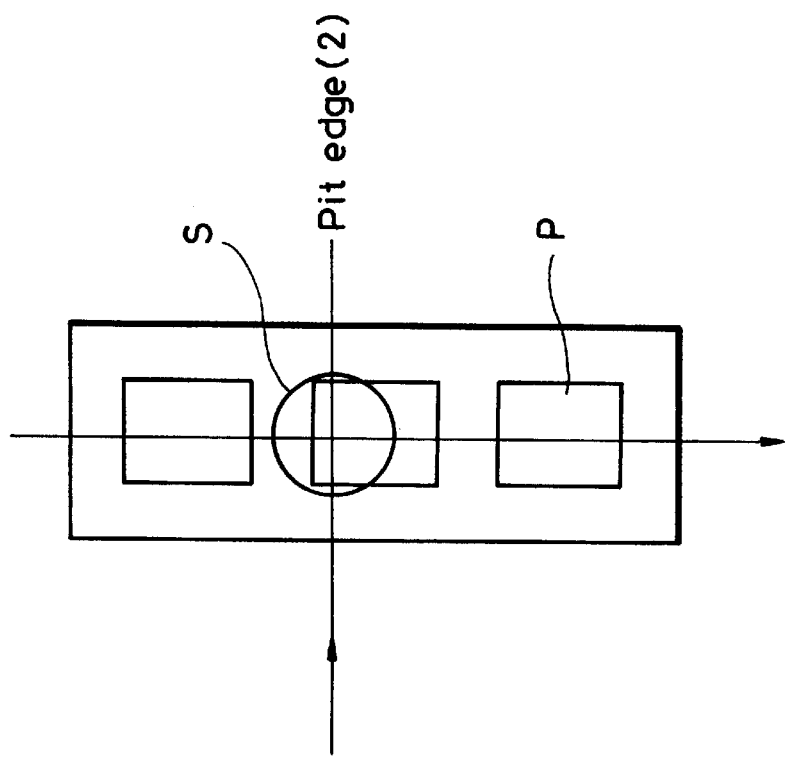
FIGS. 10A and 10B are each a schematic diagram of pit edges.
Figure 10B:
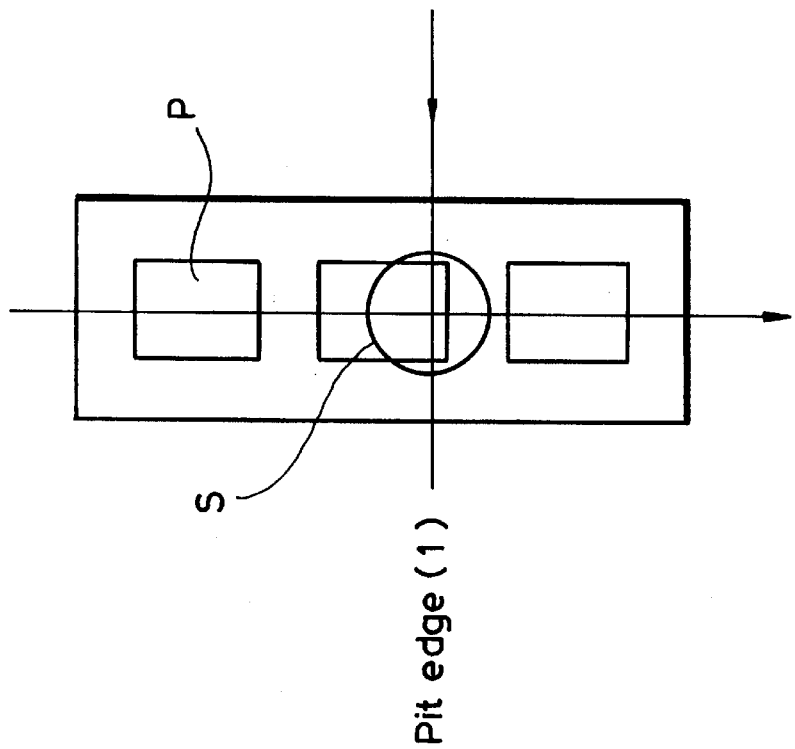

Initially, FIG. 10 is a schematic diagram of a pit edge within an optical disk surface. FIG. 10A shows a detection position in one pit edge, pit edge (1), and FIG. 10B shows a detection position in the other pit edge, pit edge (2), respectively. In FIGS. 10A and 10B, vertical arrows represent the moving direction of the recording medium, and horizontal arrows represent detection directions. A beam spot S or pit row is moved, and the detection in the respective pit edges, pit edge (1), pit edge (2) can be executed.

Figure 12:
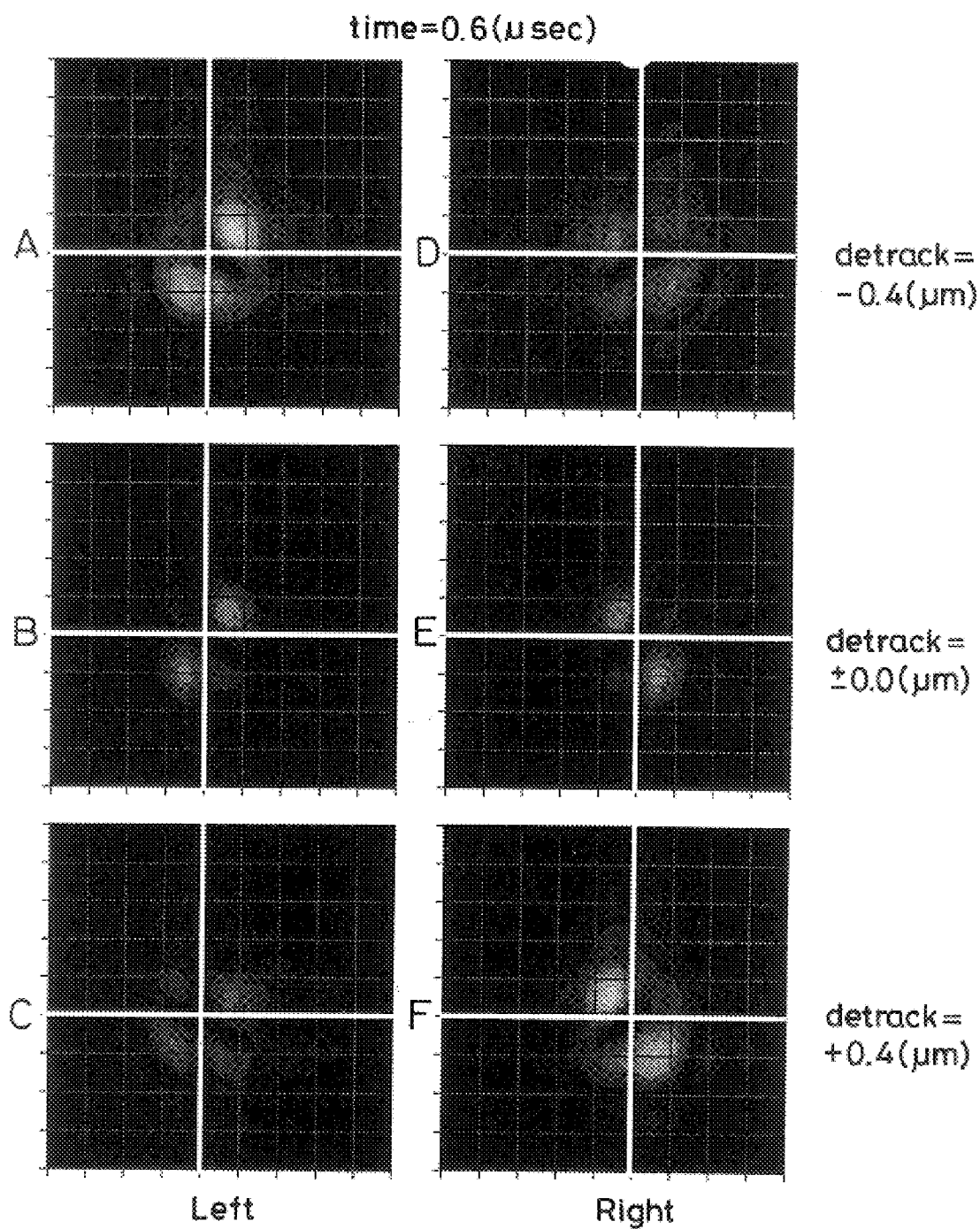
FIG. 12 shows interference patterns, in which A to C are interference patterns are in the left-hand side photo-diodes; and D to F are interference patterns in the right-hand side photo-diodes.
Figure 13:
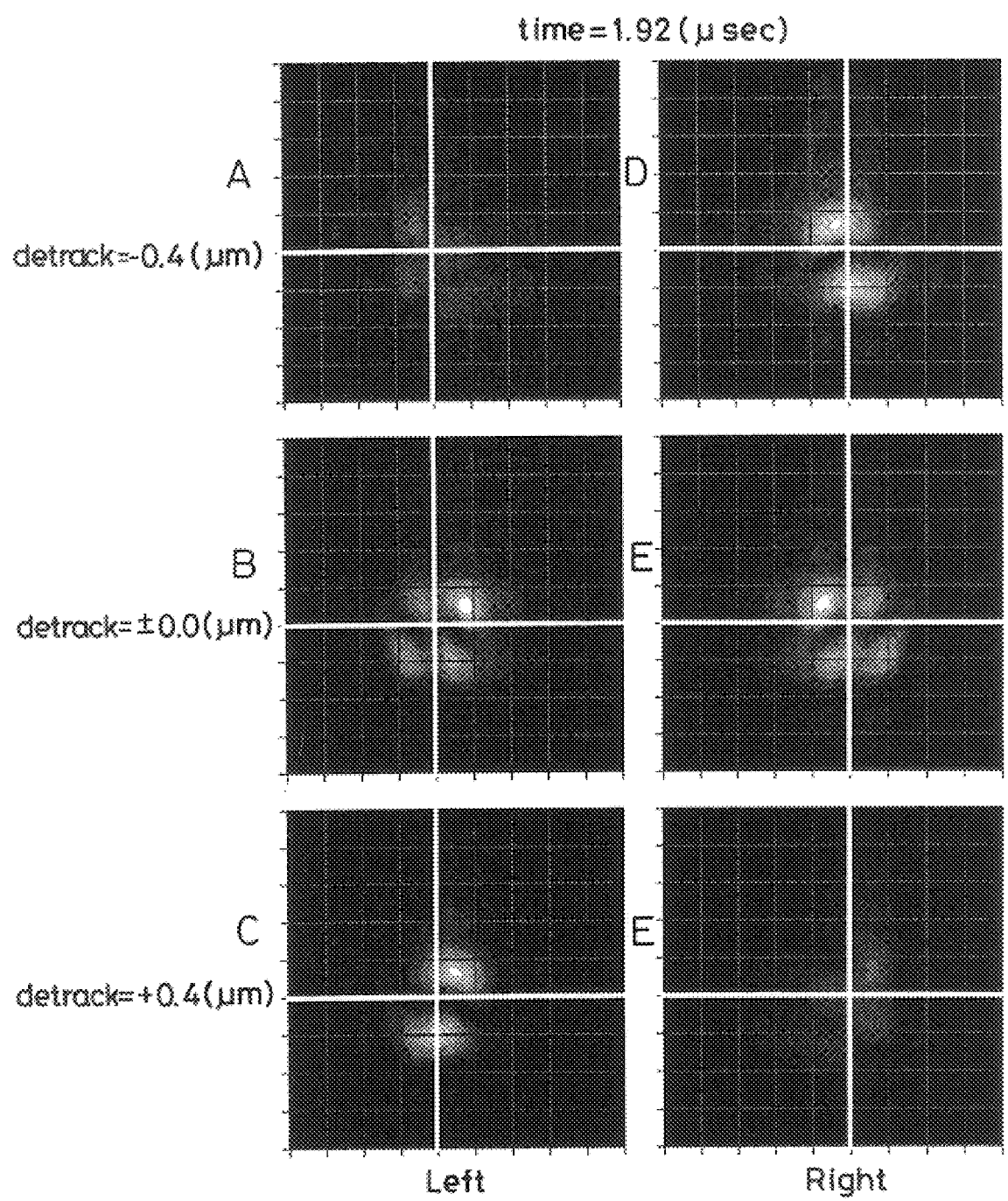
FIG. 13 shows interference patterns, in which A to C are interference patterns in the left-hand side photo-diodes; and D to F interference patterns in the right-hand side photo-diodes.
Figure 14:
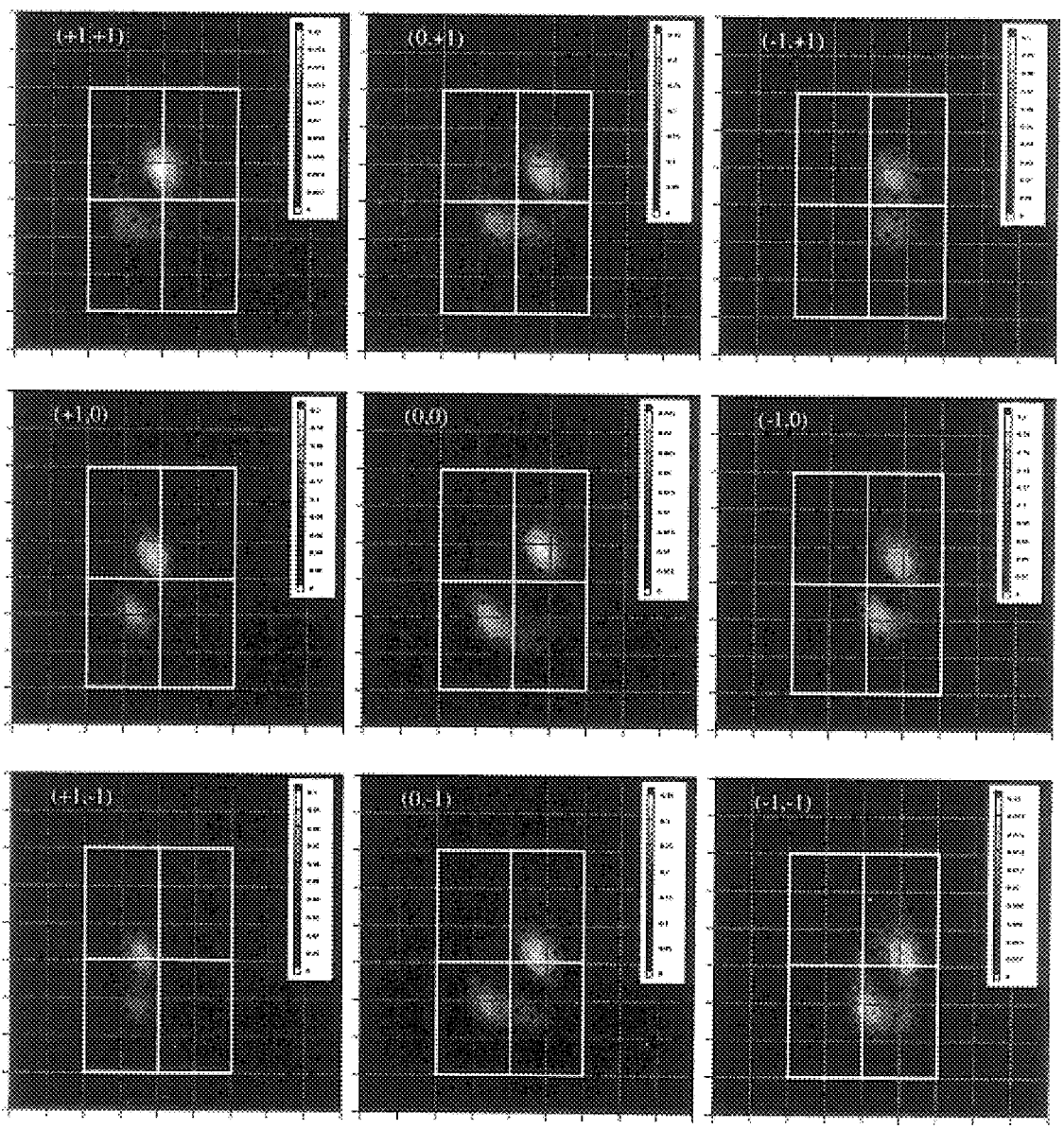
FIG. 14 is a pattern showing a relationship between respective diffracted light landing positions in the left-hand side photo-diode.
Figure 15:
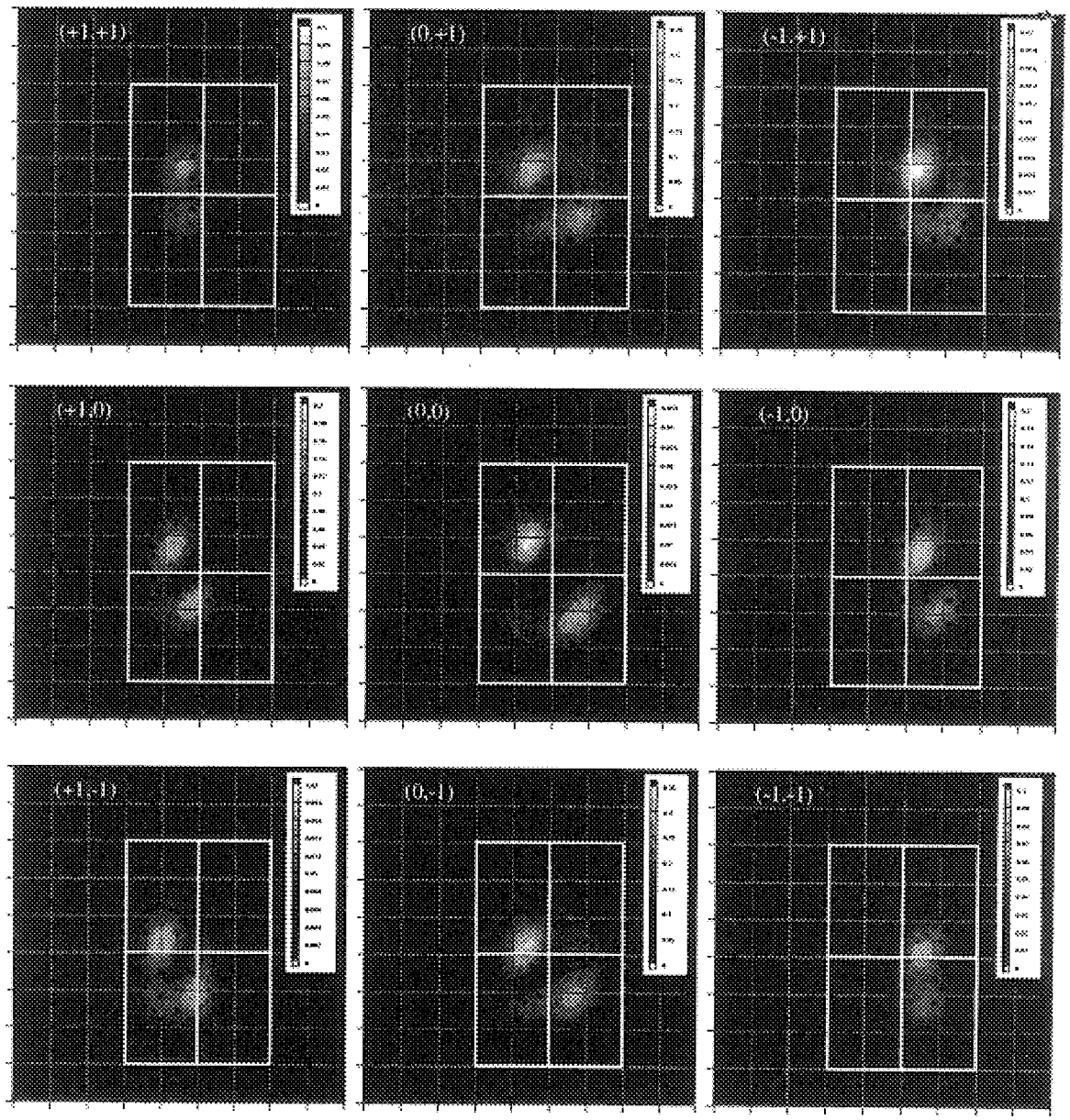
FIG. 15 is a pattern showing a relationship between respective diffracted light landing positions in the right-hand side photo-diode.

FIGS. 12 and 13 show interference patterns obtained on the photo-diode PD, and FIGS. 14 and 15 show computed results of the landing positions of the diffracted lights, respectively. In FIGS. 12 to 15, a distance from the confocal position to the split PD was selected as L=100 $\mu$m, the size of the whole split PD was 80×80 ($\mu$m), and the landing positions were computed by the transmission simple model shown in FIG. 11.

Incidentally, the used transmission simple model is of the model such that, as shown in FIG. 11A, a returned light LR from the pit P is converged by the objective lens 3, a knife edge KE is located at the confocal position of the returned light and a returned light split by the knife edge KE is detected by the right-hand side and left-hand side quadrant photo-detectors $PD_R$ ($PD_{1R}$, $PD_{2R}$, $PD_{3R}$, $PD_{4R}$) and $PD_L$ ($PD_{1L}$, $PD_{2L}$, $PD_{3L}$, $PD_{4L}$). Incidentally, FIG. 11B is a diagram showing the right-hand side portion of FIG. 11A in an enlarged-scale, and illustrates the state in which the returned light that was converged up to the diffraction limit is split by the knife edge.

Figure 20:
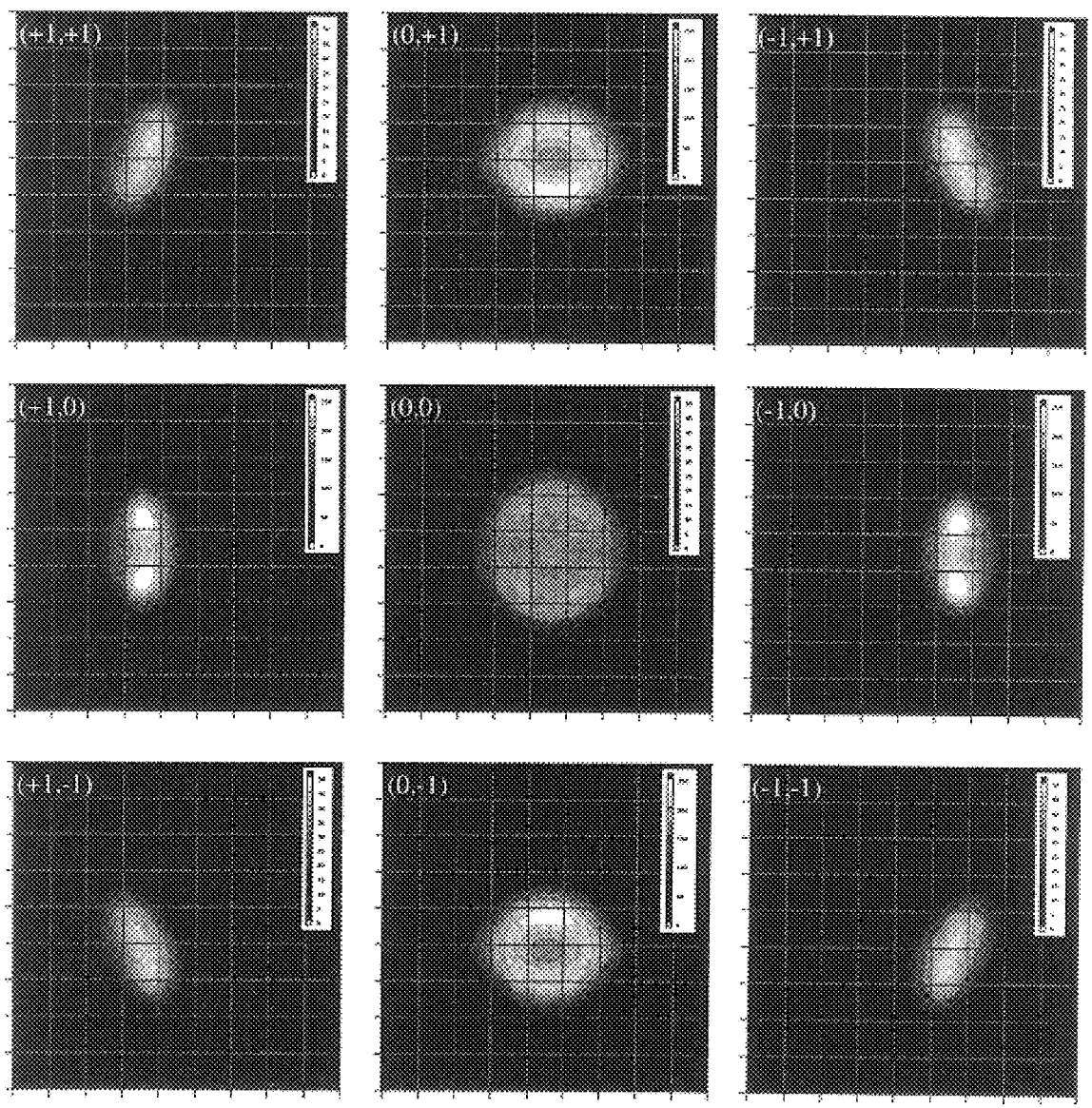
FIG. 20 is a microscopic representation showing respective diffracted light landing positions on the photo-diodes in the case of the conventional type.

In the confocal knife edge arrangement (hereinafter referred to as CKE arrangement), as shown in FIGS. 11A and 11B, although the returned light $L_R$ is split in the right and left directions by the knife edge KE formed of a pyramid mask located at the confocal position, it is clear from FIGS. 12 and 13 that the changes of the patterns relative to the detracks on the respective separated sides (hereinafter referred to as channels) approximately conform to the changes of the patterns of the prior-art type (structure without knife edge based on the semiconductor structure of triangular pyramid shape; the landing position of each diffracted light is seen in FIG. 20) shown in FIG. 21.

Incidentally, distributions of right and left interference patterns in actual practice are affected by the pyramid action and thereby images thereof are inverted when the returned light $L_R$ is reflected by the reflection surfaces $M_2$, $M_3$ of the semiconductor structure 4 of triangular pyramid shape.

Figure 21:
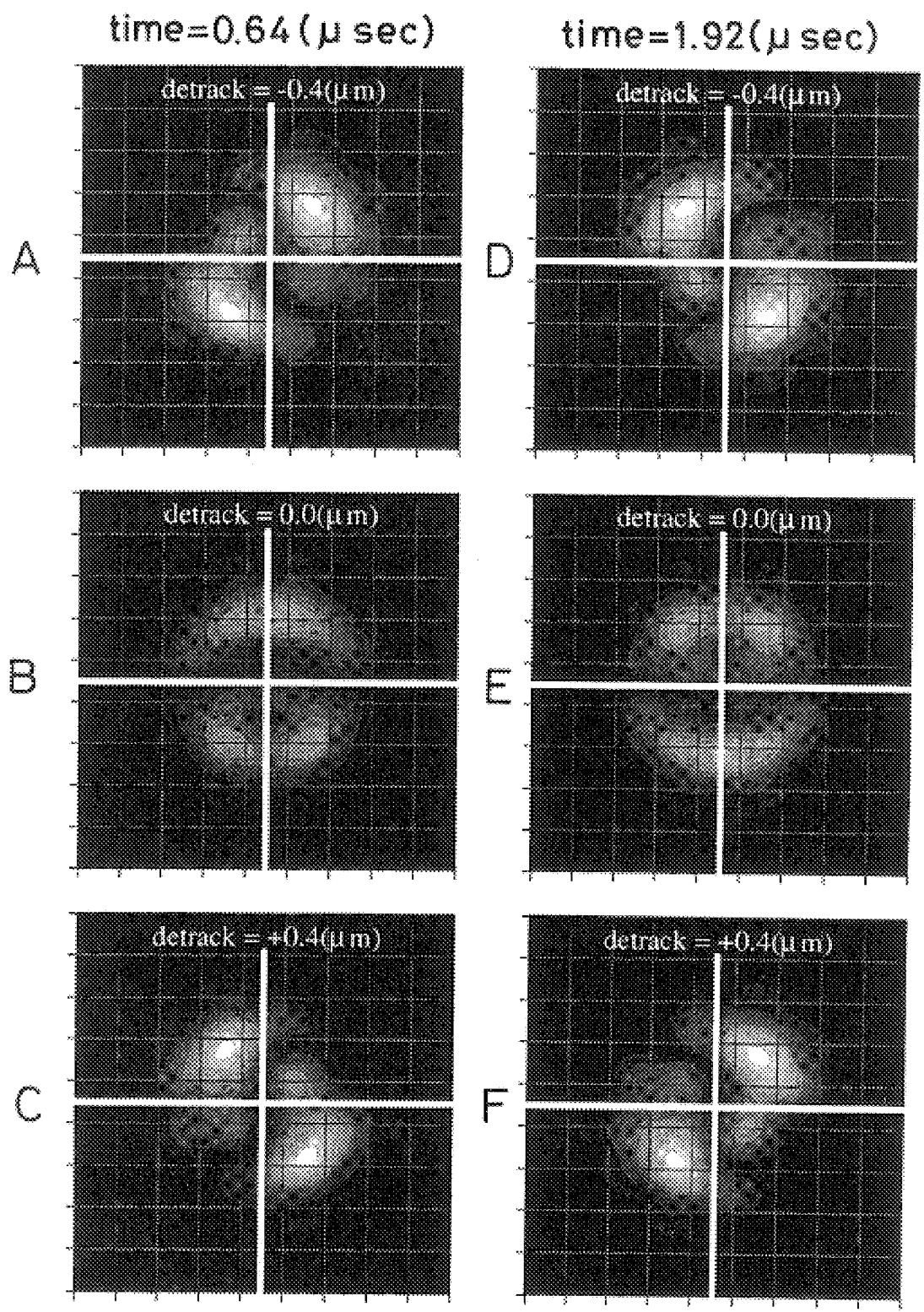
FIG. 21 is microscopic representations showing interference patterns on the photo-diodes in the case of the conventional type, in which A to C are microscopic representations showing interference patterns obtained in the case of the first pit edge; and D to F are microscopic representations showing interference patterns obtained in the case of the second pit edge.

However, although the patterns are inverted by the code of the detrack in the conventional type shown in FIG. 21, according to the CKE arrangement, as shown in FIGS. 12 and 13, the patterns in the right and left channels are not so changed to the extent that the pattern is inverted by the code of the detrack. Thus, when a crosswise computation, e.g. {(upper left+lower right)−(upper right+lower left)} is executed, an amount of light is deviated on the position at which the computed result becomes + or −, However, the offset amounts in the left and the right are the same.

Also, it is clear that since a difference of sum of signals of imaginary PDs (upper left and lower right or upper right and lower left) located at the crosswise relationship is computed on each of the right and left channels and the signals of both channels are added, the tracking error signal TE may be obtained.

Further, it can be easily assumed from the patterns that the push-pull signal obtained from the left and right photo-diode PD group in each channel in both of the right and left channels becomes approximately zero regardless of the detrack amount. That is, it is to be understood that the push-pull signal becomes zero.

Figure 16:
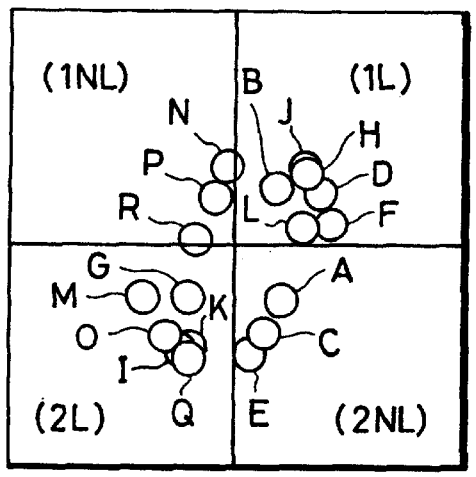
FIG. 16 is a diagram used to explain a relationship between a CKE arrangement and a conventional type.
Figure 16:
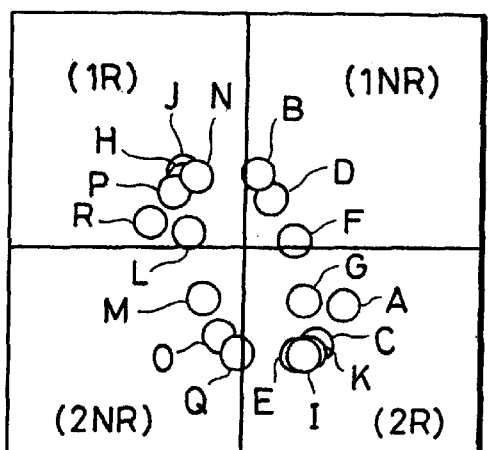
Figure 16:
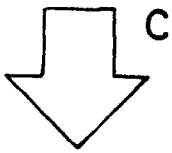
Figure 16:
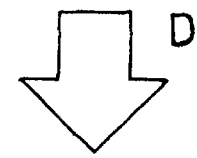
Figure 16:
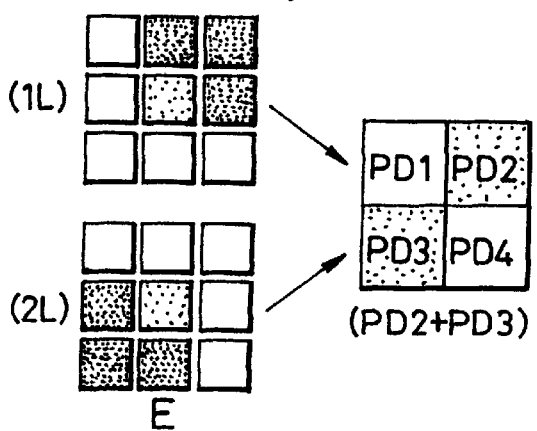
Figure 16:
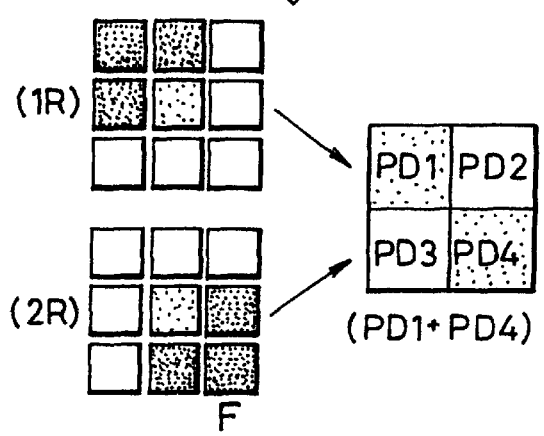

As shown in FIG. 16, when portions near the centers of intensities of the respective diffracted lights shown in FIGS. 12 and 13 are plotted on the same pattern (A and B in FIG. 16), it is clear that, as shown on the middle columns of FIG. 16 (C and D in FIG. 16), in the respective channels, respective diffracted lights are located at terms which strongly interfere with a (0, 0) light and located at terms which interfere with light as weakly as approximately a background.

On the left-hand side, for example, diffracted components which strongly interfere with the (0, 0) light are diffracted components which are landed at the positions near (1L), (2L). Of these terms, respective terms of J(0, 0), D(−1, 0), B(−1, +1), H(0, +1) in (1L) and respective terms of I(0, 0), O(+1, 0), Q(+1, 0), K(0, −1) in (2L) are respectively important factors for the interference patterns.

On the other hand, as terms which hardly interfere with the (0, 0) light, there are terms which are landed at the areas of (1NL),(2NL). These terms are respectively interference of N(+1, +1), P(+1, 0), R(+1, −1) and interference of A (−1, +1), C(−1, 0), E(−1, −1). Thus, these terms hardly interfere with a (0, X) component, and hence do not contribute to the tracking error signal TE so much.

E and F in FIG. 16 on the lowermost column of FIG. 16 schematically show these states by the landing positions of the interference terms and the interference components of the conventional type. From these sheets of drawings, it is clear that (1L) and (2L) in the same sheets of drawings are conforming to the interference components equivalent to $PD_2$ and $PD_3$ of the conventional type. Although these terms are able to act in accordance with the prior-art so-called phase difference detection method, the terms which are equivalent to $PD_1$, $PD_4$ are hardly functioning so that there may be obtained the tracking error signal TE only in one of the left and right channels by the phase difference detection method having the offset.

Figure 22A:
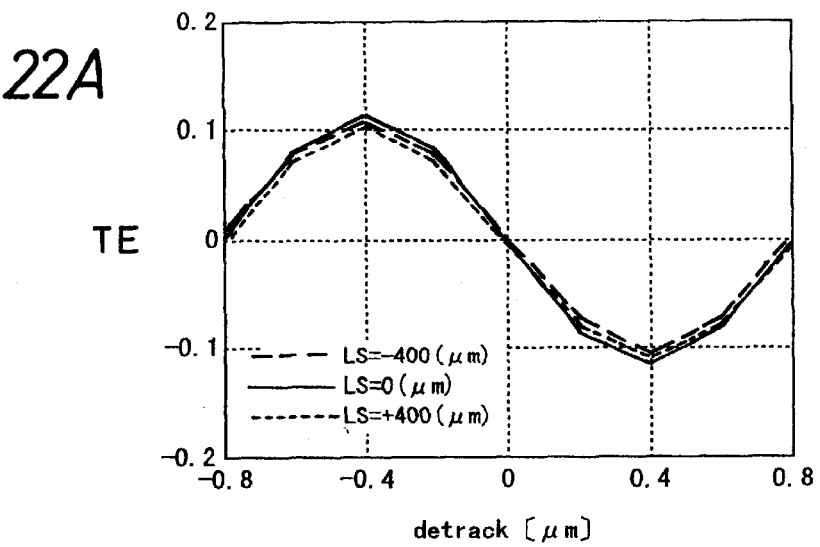
FIGS. 22A to 22C are respectively graphs each signal and the decocusing amount according to the method.
Figure 22B:
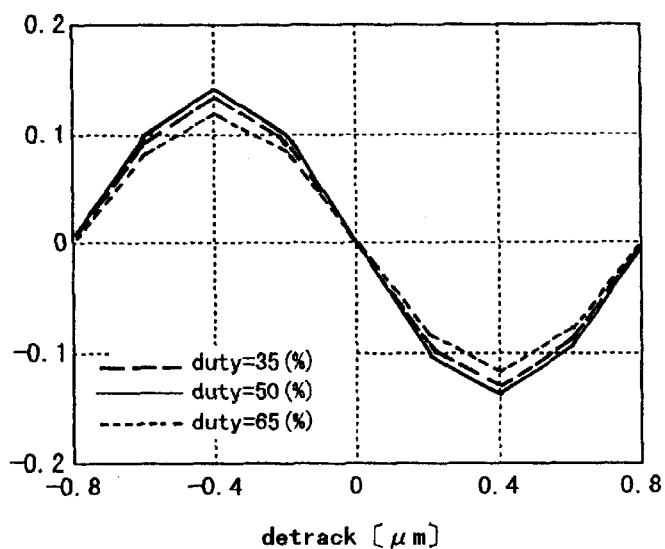
Figure 22C:
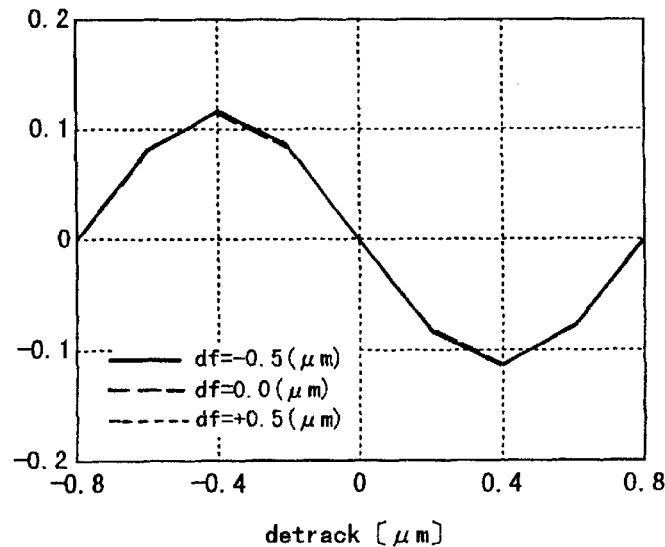

From a similar discussion, it is clear that the signal obtained on the right-hand side is the term equivalent to $PD_1$ and $PD_4$ of the conventional type and a signal conforming to a signal $[(PD_1+PD_4)-(PD_2+PD_3)]$ obtained by the conventional-type phase difference detection method is obtained as a computed result of the signal obtained on the left-hand side and the signal obtained on the right-hand side (see signal characteristics obtained by the phase difference detection method of the conventional type of FIG. 22 and signal characteristics obtained in the case of the CKE arrangement of FIG. 17 (characteristics corresponding to Expression 4).

Also, the offsets are equal to each other on the right-hand and left-hand sides, and these offsets are canceled each other out in the tracking error signal which was obtained as the subtracted result.

Accordingly, by computing the signal obtained on the left-hand side and the signal obtained on the right-hand side, it is possible to obtain a satisfactory tracking error signal TE without any offset similarly to the signal obtained by the phase difference detection method of the conventional type.

On the basis of the above-described relationship, it is possible to obtain a stable tracking error signal by computing the detection signal in one pit edge according to the equations shown on the following Expressions 2 to 4. When any of calculation equations on the Expressions 2 to 4 is used, as a result, there may be obtained substantially the same tracking error signal. This is caused by the fact that the computation of the Expressions 2 to 4 detects the tracking error signal by the mechanism same as that shown in FIG. 16.

$$TE = TE(1) = (PD_{1L} + PD_{4L}) - (PD_{1R} + PD_{4R}) \quad (2)$$

$$TE = TE(2) = \{(PD_{2L} + PD_{3L}) - (PD_{1L} + PD_{4L})\} - \{(PD_{2R} + PD_{3R}) - (PD_{1R} + PD_{4R})\} \quad (3)$$

-continued
$$TE = TE(3) = PD_L - PD_R \quad (4)$$
$$= (PD_{1L} + PD_{2L} + PD_{3L} + PD_{4L}) - (PD_{1R} + PD_{2R} + PD_{3R} + PD_{4R})$$

where each suffix in Expressions 2 to 4 corresponds to that in FIG. 11.

In the Expression 3, the tracking error signal TE is obtained by computing a difference between the second detection signal $\{(PD_{2L}+PD_{3L})-(PD_{1L}+PD_{4L})\}$ which results from computing the signals detected by the quadrant photo-diodes $PD_{1L}$ to $PD_{4L}$ in the second detection element, i.e. the left-hand side photo-diode PDL by the crosswise-computation like the phase difference detection method and the first detection signal $\{(PD_{2R}+PD_{3R})-(PD_{1R}+PD_{4R})\}$ which results from computing the signals detected by the quadrant photo-diodes $PD_{1R}$ to $PD_{4R}$ in the first detection element, i.e. the right-hand side photo-diode $PD_R$ by the crosswise-computation like the phase difference detection method.

In the Expression 4, in the pit edge (1) or (2), the tracking error signal TE is obtained by computing a difference between the whole detection signals in the second detection element, i.e. the left-hand side photo-diode $PD_L$ and the whole detection signals in the first detection element, i.e. the right-hand side photo-diode $PD_R$.

Accordingly, the computation equation on the Expression 4 may also be applied to the case in which the left-hand side and right-hand side photo-diodes $PD_L$, $PD_R$ are not split by four, e.g. the left-hand side and right-hand side photo-diodes are split by two or not split at all. This is sufficient to obtain the tracking error signal of the optical recording medium in which the pit depth is λ/4n.

When it is intended to arrange the optical device such that the optical device may provide a tracking error signal of an optical recording medium in which a pit depth is not λ/4n(e.g. pit depth is λ/8n), the right-hand side and left-hand side photo-diodes $PD_R$, $PD_L$ are split so that other tracking error detection methods, e.g. a CKE arrangement push-pull method (CKE-PP) may be used.

Also, when the focusing error signal is detected by the right-hand side and left-hand side photo-diodes $PD_R$, $PD_L$, the right-hand side and left-hand side photo-diodes $PD_R$, $PD_L$ should be split.

As described above, if the right-hand side and left-hand side photo-diodes $PD_R$, $PD_L$ are each split by four in order that the tracking error signal of the optical recording medium in which the pit depth is not λ/4n may be obtained and that the focusing error signal FE also may be obtained, then it is possible to obtain the tracking error signal of the optical recording medium in which the pit depth is λ/4n by any computation equation of Expressions 2 to 4.

Then, in the transmission model shown in FIG. 11, the computation equation of the tracking error signal TE based on the CKE arrangement push-pull method (CKE-PP) is represented by the following Expression 5.

$$TE(CKE-PP)=\{(PD_{1L}+PD_{2L})-(PD_{3L}+PD_{4L})\}-\{(PD_{1R}+PD_{2R})-(PD_{3R}+PD_{4R})\} \quad (5)$$

Figure 17A:
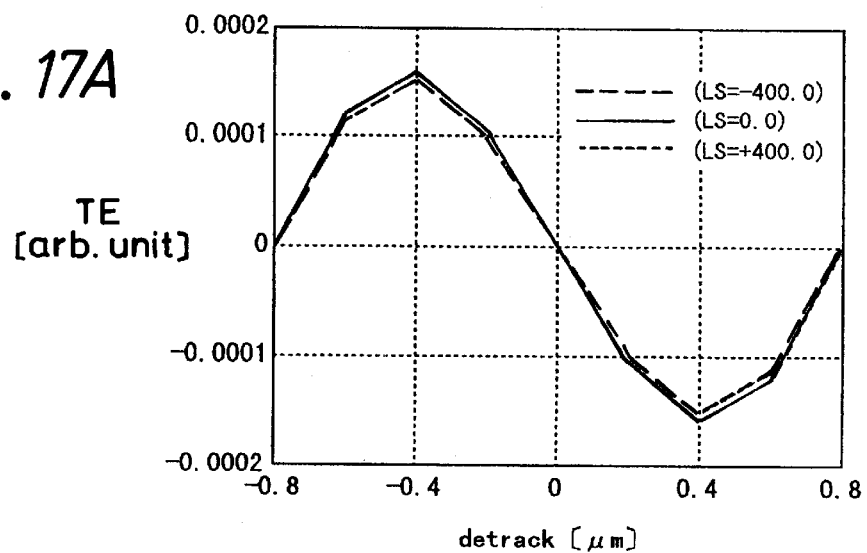
FIG. 17A is a graph showing the manner in which the tracking error signal is changed relative to the lens shift.
Figure 17B:
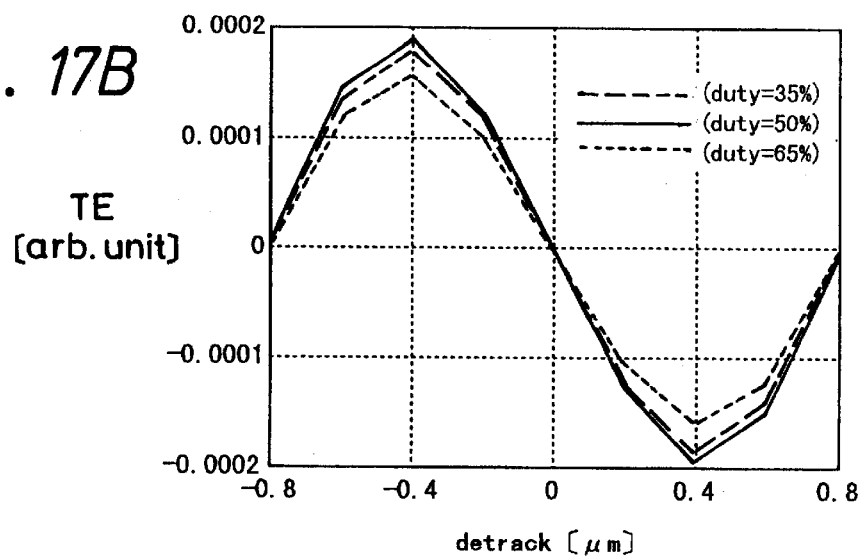
FIG. 17B is a graph showing a relationship between a duty of a disk pit and the tracking error signal.
Figure 17C:
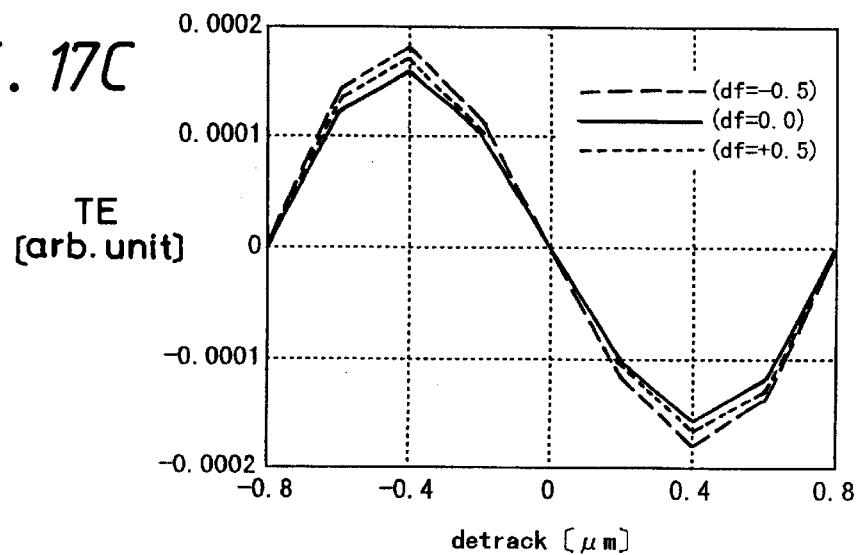
FIG. 17C is a graph showing the manner in which the tracking error signal is changed when an image becomes out of focus in the extent of approximately the focal depth.

FIG. 17 shows characteristics of the tracking error signal TE relative to respective parameters computed by the above-mentioned computation equation (Expression 4). FIGS. 17A to 17C show lens-shift characteristics of the radial direction of the disk, duty ratio dependence characteristics and focus dependence characteristics within the focal depth, respectively. A study of these graphs reveals that the above-mentioned method has provided satisfactory results and that the above-mentioned method is the effective tracking error signal TE detecting means.

Figure 18A:
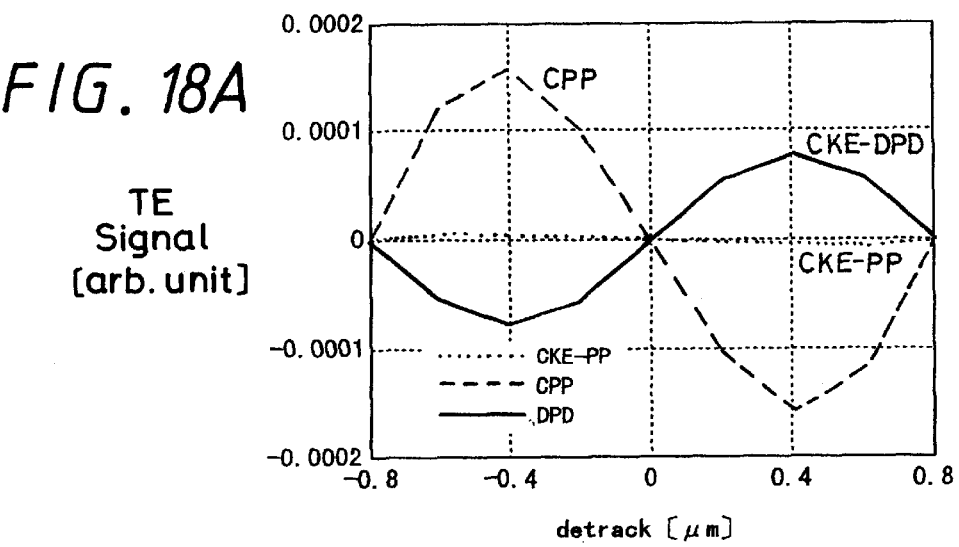
FIG. 18A is a graph showing compared results obtained when the tracking error signal is detected by the CKE arrangement DPD method and other methods.

FIG. 18A shows compared results of the tracking error signals obtained by the respective detection methods when the split lines of the photo-diodes PDR, PDL are made common in the CKE-DPD, i.e. CKE arrangement phase difference detection method according to the present invention and the CKE-PP, i.e. CKE arrangement push-pull method. Incidentally, FIG. 18A shows compared results obtained in the case of the aforementioned CPP signal.

Figure 18B:
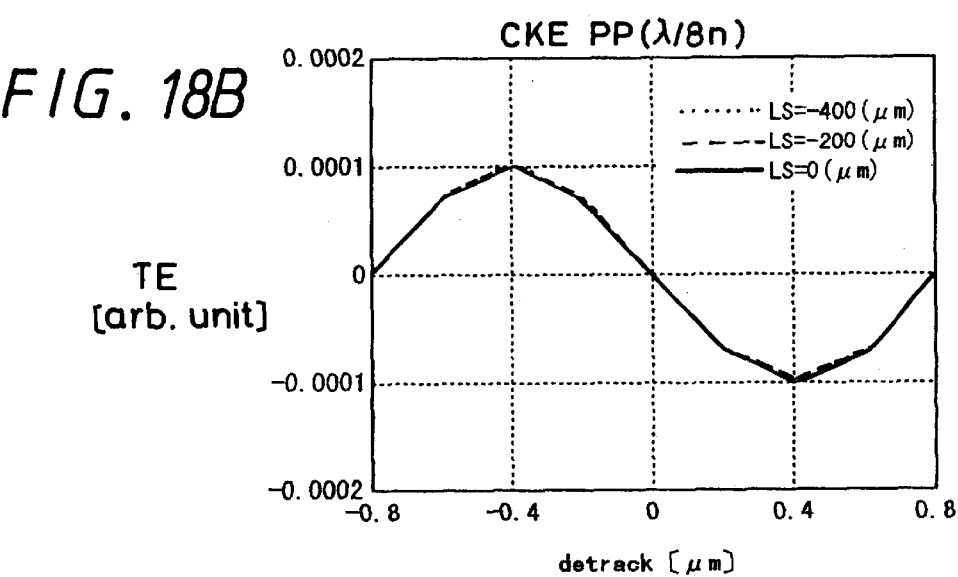
FIG. 18B is a graph showing measured results obtained by the CKE push-pull method in the CKE arrangement when the tracking error signal is changed by the lens shift.
Figure 18C:
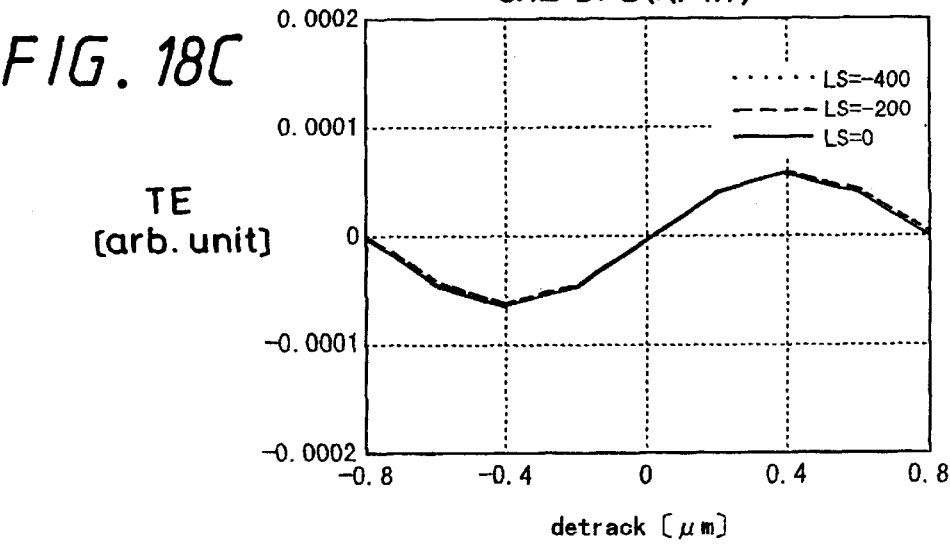
FIG. 18C is a graph showing measured results obtained by the DPD method in the CKE arrangement when the tracking error signal is changed by the lens shift.

Also, FIGS. 18B and 18C show calculated results of the changes caused in the tracking error signal TE by the lens shift when the tracking error signal is detected from the optical recording medium in which the pit depth is λ/8n by the CKE-PP method and the tracking error signal is detected from the optical recording medium in which the pit depth is λ/4n by the CKE-DPD method, respectively.

In FIGS. 18A, 18B and 18C, the respective signals are calculated by using the conditions in which the photo-diodes are split by a split line which is optimized such that the CKE-PP signal and the focus error signal (see Expression 10) are obtained fundamentally.

Then, a study of FIGS. 18A, 18B and 18C reveals that any method may accurately provide the tracking error signal TE without being affected by the lens shift, the split lines of the CKE-DPD and CKE-PP may be made common and that the tracking error signal TE may be obtained regardless of the fact that the pit depth of the optical recording medium is λ/4n or λ/8n. Incidentally, in the case of the CKE-PP, a tracking error signal conforming to the result of λ/8n is obtained from recording media in which pit depths are other than λ/4n.

Accordingly, the manufacturing process need not be varied and it becomes possible to obtain the respective tracking error signals TE of CKE-PP, CKE-DPD. Thus, the optical device has a great advantage that one CKE device may cope with media (optical disks) having a variety of pit depths.

While the computations have been executed so far on the transmission type model shown in FIG. 11, similar idea may be applied to the optical device of the arrangement shown in FIG. 8.

Initially, with respect to the right and left interference patterns in actual practice, the distributed images are inverted by reflecting the returned light $L_R$ on the reflection surfaces $M_2$, $M_3$ of the semiconductor structure 4 of the triangular pyramid shape as described before.

Accordingly, in the photo-diodes $PD_L$ ($PD_{1L}$, $PD_{2L}$, $PD_{3L}$, $PD_{4L}$), $PD_R$ ($PD_{1R}$, $PD_{2R}$, $PD_{3R}$, $PD_{4R}$) of the arrangement shown in FIG. 8, when compared with the case of the model, a positional relationship of the landing position of each diffracted light is replaced with each other in $PD_{1L}$ and $PD_{4L}$, $PD_{1R}$ and $PD_{4R}$.

That is, although $PD_{1L}$ and $PD_{4L}$, $PD_{1R}$ and $PD_{4R}$ are replaced with each other, the computation equations of the tracking error signal TE become similar to those of the Expressions 2 to 4 as shown in the following Expressions 6 to 8.

$$TE = TE(1) = (PD_{1L} + PD_{4L}) - (PD_{1R} + PD_{4R}) \quad (6)$$

$$TE = TE(2) = \{(PD_{2L} + PD_{3L}) - (PD_{1L} + PD_{4L})\} - \quad (7)$$
$$\{(PD_{2R} + PD_{3R}) - (PD_{1R} + PD_{4R})\}$$

$$TE = TE(3) \quad (8)$$
$$= (PD_{1L} + PD_{2L} + PD_{3L} + PD_{4L}) -$$
$$(PD_{1R} + PD_{2R} + PD_{3R} + PD_{4R})$$

Incidentally, with respect to the tracking error signal TE based on the CKE-PP method, since $PD_1$ and $PD_4$ are replaced with each other, the content of the computation equation also is changed as shown by the Expression 9.

$$TE(CKE - PP) = \{(PD_{1L} + PD_{3L}) - (PD_{2L} + PD_{4L})\} - \quad (9)$$
$$\{(PD_{1R} + PD_{3R}) - (PD_{2R} + PD_{4R})\}$$

As described above, by computing the first detection signal which results from detecting the diffracted light from one pit edge by the first detection element and the second detection signal which results from detecting the diffracted light from one pit edge by the second detection element, it is possible to detect the tracking error signal from the optical recording medium in which the pit depth is λ/4n.

Also, even when there is a very small defocusing corresponding to the focusing servo in actual practice, the tracking error signal may be detected accurately.

Incidentally, the focusing error signal FE may be detected by using the two quadrant photo-diodes $PD_R$, $PD_L$ according to the well-known detection method independently of the pit depth of the optical recording medium.

For example, the focusing error signal FE may be obtained by executing the computation as shown by the following Expression 10.

$$FE = (PD_{1L} - PD_{4L}) + (PD_{1R} - PD_{4R}) \quad (10)$$

Then, if the two split lines which are crossing each other are drawn such that the two quadrant photo-diodes may detect the tracking error signal and the focusing error signal based on the CKE-PP method, then even though the pit depth of the optical recording medium is λ/4n or λ/8n, the two quadrant photo-diodes may obtain the tracking error signal TE and may detect the focusing error signal FE.

Figure 19:
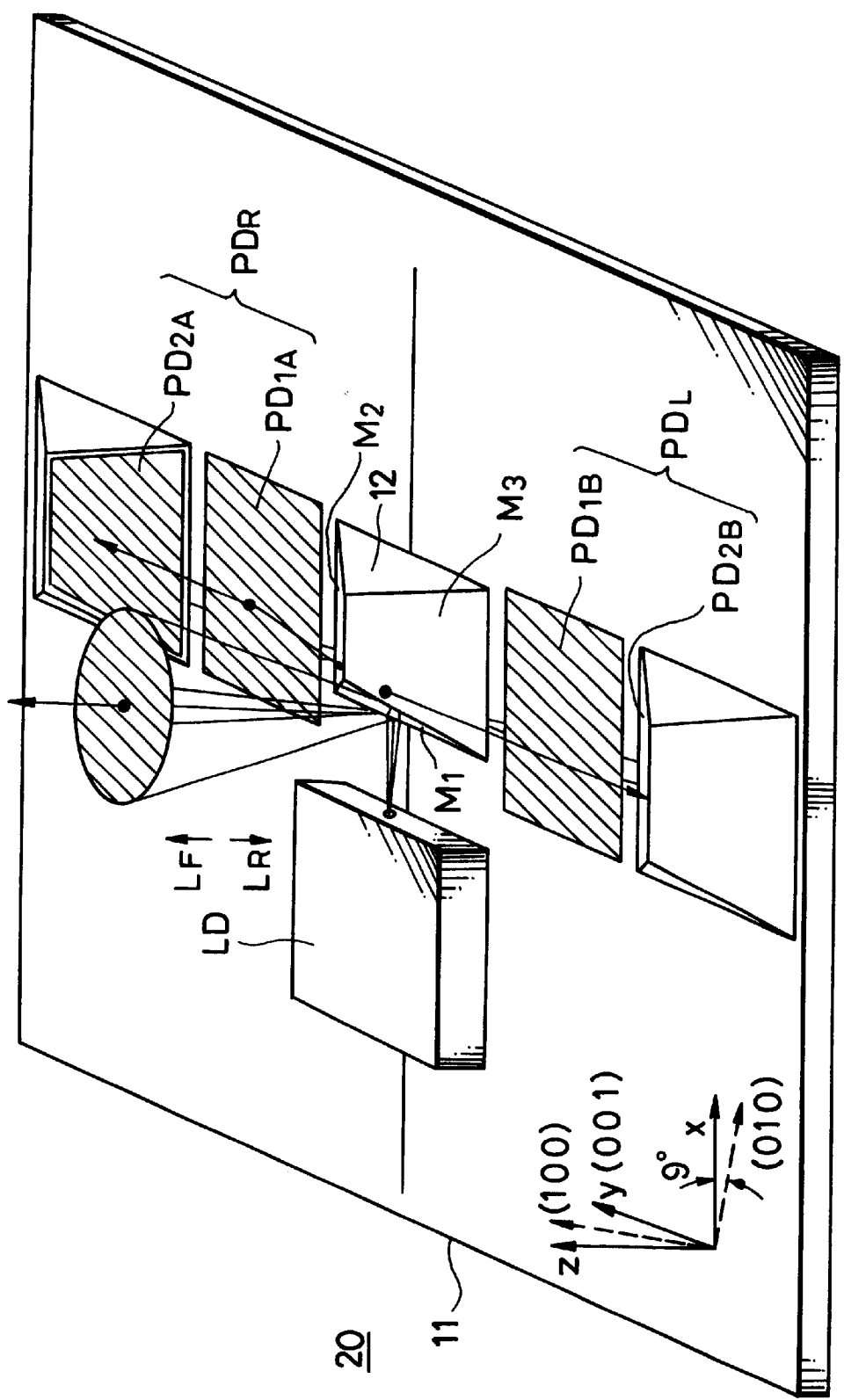
FIG. 19 is a schematic perspective view of an optical device according to other embodiment of the present invention.

FIG. 19 shows an optical device according to other embodiment of the present invention.

This optical device 20 includes a semiconductor structure 12 located near the confocal position of a returned light LR which results from reflecting a light $L_F$ emitted from a semiconductor laser LD by an irradiated portion and photo-diodes $PD_{1A}$, $PD_{2A}$, $PD_{1B}$, $PD_{2B}$ serving as the photo-detection elements respectively opposed to a second reflection surface $M_2$ and a third reflection surface $M_3$ which are different from a first reflection surface $M_1$ for reflecting the emitted light $L_F$ from this semiconductor structure 12. The second reflection surface $M_2$ and the third reflection surface $M_3$ are located so as to reflect a part of the returned light $L_R$ and the photo-detection elements are adapted to detect signals.

Also, the semiconductor structure 12 having four crystal planes (1-1-1), (11-1), (1-11), (111) is disposed on a semiconductor substrate 11 which is inclined from a crystal plane (100), for example, in a <011> direction by approximately 9°. The crystal plane (1-1-1) forms the first reflection surface $M_1$ opposing the semiconductor laser LD, the crystal plane (1-11) forms the second reflection surface $M_2$ and the crystal plane (1-11) forms the third reflection surface $M_3$, respectively. Further, the photo-diodes $PD_{1A}$, $PD_{2A}$ are sequentially disposed from the semiconductor structure 12 along the light path in an opposing relation to the second reflection surface $M_2$, and the photo-diodes $PD_{1B}$, $PD_{2B}$ are sequentially disposed from the semiconductor structure 12 along the light path in an opposing relation to the third reflection surface $M_3$, respectively. Furthermore, the photo-diodes $PD_{2A}$, $PD_{2B}$ are respectively disposed on the crystal plane (11-1) and (1-11) portions formed on the substrate 11.

In this optical device 20, the laser light emitted from the semiconductor laser LD is reflected by the first reflection surface $M_1$ on the semiconductor structure 12 in the direction substantially perpendicular to the substrate 11, converged by a converging means, not shown, and then focused on the irradiated portion such as an optical recording medium or the like. The returned light $L_R$ reflected on the irradiated portion is again converged by the converging means and reflected on the second reflection surface $M_2$ and the third reflection surface $M_3$ of the semiconductor structure 12. The returned light $L_R$ that was reflected on the second reflection surface $M_2$ is received by the right-hand side photo-diode $PD_R$ ($PD_{1A}$, $PD_{2A}$). The returned light $L_R$ that was reflected on the third reflection surface $M_3$ is received by the left-hand side photo-diode $PD_L$ ($PD_{1B}$, $PD_{2B}$).

Similarly to the optical device 10 according to the preceding embodiment, this optical device 20 also may obtain the first detection signal which results from detecting the diffracted light from one pit edge of the disk by the right-hand side photo-diode $PD_R$ ($PD_{1A}$, $PD_{2A}$) and the second detection signal which results from detecting the diffracted light from one pit edge by the left-hand side photo-diode $PD_L$ ($PD_{1B}$, $PD_{2B}$) and may obtain the tracking error signal TE by computing the first detection signal and the second signal.

As the above-mentioned computation, there may be used $TE=PD_R-PD_L=(PD_{1A}-PD_{1B})$ or $(PD_{2A}-PD_{2B})$, for example, a computation in which a difference between the first detection signal and the second detection signal is computed and compared or the like.

The focusing error signal FE may be obtained by $FE=(PD_{1A}-PD_{2A})+(PD_{1B}-PD_{2B})$ and by computing the signals from the photo-diodes disposed near the semiconductor structure 12 and the signals disposed away from the semiconductor structure 12.

Thus, similarly to the optical device 10 according to the preceding embodiment, it is possible to detect the tracking error signal which is sufficient for the standardized disk in which the pit depth is $\lambda/4n$. Also, it is possible to obtain the tracking error signal TE which is strong against the influences of the lens shift and the defocusing.

Incidentally, while the photo-diodes $PD_{2A}$ and $PD_{2B}$ disposed at the succeeding stage of the left and right photo-diodes $PD_R$, $PD_L$ are disposed on the crystal planes formed as the inclined surfaces from the semiconductor substrate 11 in the embodiment of FIG. 19, the photo-diodes $PD_{2A}$ and $PD_{2B}$ of the succeeding stage may be disposed on the plane of the concave portion formed on the semiconductor substrate 11.

Incidentally, in addition to the above-mentioned embodiments, even when the light-emitting unit and the light-receiving unit are prepared as individual elements, combined and manufactured as is proposed in the prior art, if the light-emitting unit, the light-receiving unit and optical assemblies comprising the knife edge are disposed properly, then the above-mentioned computation method may be applied thereto.

The above-mentioned optical device has the features in the CLC device and in detecting the tracking servo signal, and hence has the following advantages:

(1) The tracking error signal becomes strong against the lens shift similarly to the conventional ordinary phase difference detection system;

(2) Since no additional optical assemblies are required in order to detect the tracking error signal and the focusing error signal, there may be arranged the simple optical system in which the number of assemblies are reduced. Accordingly, the assembly process and the adjustment process may be simplified;

(3) As the number of assemblies is reduced and the process is simplified, a manufacturing cost may be reduced;

(4) Since no additional optical assemblies are required, an optical loss may be reduced, and a low power consumption may be realized;

(5) Since the semiconductor laser, the photo-detection elements and the semiconductor structure of the triangular pyramid shape are formed on the same semiconductor substrate, an aging change occurred after the optical device was completed is small;

(6) The optical device may be miniaturized and made light in weight and thereby a response speed may be improved;

(7) An optical recording medium having a higher linear velocity may be recorded/reproduced with a power consumption substantially equivalent to that of the prior art;

(8) Since elements may be manufactured by the semiconductor batch process, the optical device may be manufactured inexpensively;

(9) Since the crystal growth of the semiconductor structure formed near the end face of the semiconductor laser LD is automatically stopped after a crystal of a predetermined shape was grown, the semiconductor structure may be formed as is designed and manufactured with a satisfactory yield and, hence the optical device may be manufactured inexpensively with a satisfactory reproducibility; and

(10) When the light-receiving element of each channel is formed as the quadrant light-receiving elements, the photo-detection element may detect a signal based on the CKE-PP (confocal knife edge-push-pull method), and may cope with disks having various pit depths. Accordingly, it is possible to make an optical device which may cope with a plurality of kinds of disks in which the recording and reproducing wavelengths are the same but the pit depths are different.

According to the above-mentioned optical device of the present invention, since the photo-detection elements are formed on the concave portion of the semiconductor substrate retreated by the predetermined depth from the substrate surface of the semiconductor substrate at its portion in which the semiconductor laser is formed, the diffracted pattern of the returned light obtained from the converging means after the returned light was reflected on the reflection surface may be separated satisfactorily and received by the photo-detection elements. Thus, the fluctuation caused in the tracking error signal by the defocusing may be removed, and the more accurate tracking servo may be carried out.

Also, the offset caused in the tracking error signal by the lens shift may be reduced considerably as compared with the prior art.

In particular, the first detection signal which results from detecting the diffracted light from one pit edge of the pits by the first detection element and the second detection signal which results from detecting the diffracted light from one pit edge by the second detection element are obtained and the first detection signal and the second detection signal are computed to obtain the tracking error signal which is sufficient for the standardized disk in which the pit depth is λ/4n.

Further, when the detection element is split so as to become able to detect tracking error signals for the disks in which pit depths are other than λ/4n, it is possible to obtain the tracking error signals in response to the disks having various pit depths.

Since no additional optical assemblies are required in order to detect the tracking error signal, it is possible to make the simple optical system in which then number of assemblies is reduced. Therefore, the adjustment process may be simplified.

Thus, the manufacturing cost of the optical device may be reduced and the loss of amount of light may be reduced, thereby resulting in the low power consumption being realized.

Also, according to the present invention, the optical device may be miniaturized and made light in weight. Further, the response speed may be improved.

Therefore, according to the present invention, it becomes possible to record/reproduce the optical recording medium having the higher linear velocity with the power consumption which is the same as that of the prior art.

Moreover, according to the present invention, it is possible to reduce the aging change occurred after the optical device was assembled.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical device, comprising:
    a lens defining an optical diffraction limit as a confocal position disposed remote from the lens; and
    an optical semiconductor element comprising
    a substrate defining a first substrate surface and a second substrate surface,
    a laser disposed on the first substrate surface to define an exterior surface, wherein the second substrate surface is retreated by a distance "d" from the exterior surface of the laser, the laser comprising a light-emitting end face,
    a photo-detecting element disposed on the second substrate surface, wherein a distance between the lens and the first substrate surface on which the laser is disposed is less than a distance between the lens and the second substrate surface on which the photo-detecting element is disposed, and
    a semiconductor structure comprising a plurality of reflection surfaces disposed to communicate between the laser, the lens and the photo-detecting element, the semiconductor structure comprising a first reflection surface, a second reflection surface, and a third reflection surface, wherein the second reflection surface opposes the lens and the photo-detecting element and is disposed near the confocal position of the lens, and wherein the third reflection surface opposes the lens and the photo-detecting element and is disposed near the confocal position of the lens.

2. The optical device of claim 1 wherein the substrate further defines an intermediate substrate surface,
    wherein a distance between the intermediate substrate surface and the lens is less than the distance between the first substrate surface and the lens and is greater than the distance between the first substrate surface and the lens, and
    wherein the semiconductor structure comprising the plurality of reflection surfaces is disposed on the intermediate substrate surface.

3. The optical device of claim 2 wherein the intermediate substrate surface is disposed parallel to the first substrate surface.

4. The optical device of claim 1 wherein the second reflection surface is disposed at an angle that is not parallel to the third reflection surface.

5. The optical device of claim 1 wherein the substrate has a concave portion and wherein the photo-detecting element is formed in the concave portion.

6. The optical device of claim 5 wherein the concave portion is of a predetermined depth and wherein the concave portion is retreated by the distance "d" from the exterior surface of the laser.

7. The optical device of claim 1 wherein the photo-detecting element comprises a plurality of photo-diodes,
    wherein each photo-diode is divided into a plurality of light receiving elements,
    wherein each light receiving element defines an area, and
    wherein at least one area of a first light receiving element is different than an area of a second light receiving element.

8. The optical device of claim 7 wherein the plurality of light receiving elements define at least one intersection,
    wherein a distance between the confocal position and the at least one intersection defines a propagation distance L, and
    wherein each photo-diode is divided into the plurality of light receiving elements as a function of the propagation distance L.

9. The optical device of claim 8, wherein the summation of the areas of each light receiving element equals an area having the size 80×80 $\mu m^2$.

10. The optical device of claim 9, wherein propagation distance L equals 100 $\mu m$.

11. The optical device of claim 7, wherein the second reflection surface is coupled to the third reflection surface at a vertex,
    wherein the photo-detecting element comprises a right photo-diode disposed to communicate with the second reflection surface and a left photo-diode disposed to communicate with the third reflection surface,
    wherein each photo-diode is divided into a plurality of light receiving elements by a first line and a second line, wherein the first line and the second line intersect at an intersection to form a first acute angle, a second acute angle, a first obtuse angle, and a second obtuse angle.

12. The optical device of claim 11, wherein a tracking error signal TE(n) is computed by an equation, wherein the equation employs a crosswise addition computation.

13. The optical device of claim 12, wherein the crosswise addition computation includes $(PD_{1L}+PD_{4L})$, where
- $PD_{1L}$ is from the light receiving element associated with first acute angle of the left photo-diode, and
- $PD_{4L}$ is from the light receiving element associated with second acute angle of the left photo-diode.

14. The optical device of claim 13, wherein the tracking error signal TE(n) is computed by employing one of the following equations, $$TE(2)=(PD_{1L}+PD_{4L})-(PD_{1R}+PD_{4R}),$$

$$TE(3)=((PD_{2L}+PD_{3L})-(PD_{1L}+PD_{4L}))-((PD_{2R}+PD_{3R})-(PD_{1R}+PD_{4R})),$$

and $$TE(4)=((PD_{1L}+PD_{2L}+PD_{3L}+PD_{4L}))-((PD_{1R}+PD_{2R}+PD_{3R}+PD_{4R})),$$

where
- $PD_{2L}$ is from the light receiving element associated with first obtuse angle of the left photo-diode,
- $PD_{3L}$ is from the light receiving element associated with second obtuse angle of the left photo-diode,
- $PD_{1R}$ is from the light receiving element associated with first acute angle of the right photo-diode,
- $PD_{2R}$ is from the light receiving element associated with first obtuse angle of the right photo-diode,
- $PD_{3R}$ is from the light receiving element associated with second obtuse angle of the right photo-diode, and
- $PD_{4R}$ is from the light receiving element associated with second acute angle of the right photo-diode.

15. The optical device of claim 11, wherein a tracking error signal TE(n) is computed by employing one of the following equations, $$TE(CKE-PP_5)=((PD_{1L}+PD_{2L})-(PD_{3L}+PD_{4L}))-((PD_{1R}+PD_{2R})-(PD_{3R}+PD_{4R})),$$

and $$TE(CKE-PP_9)=((PD_{1L}+PD_{3L})-(PD_{2L}+PD_{4L}))-((PD_{1R}+PD_{3R})-(PD_{2R}+PD_{4R})),$$

where
- $PD_{1L}$ is from the light receiving element associated with first acute angle of the left photo-diode,
- $PD_{2L}$ is from the light receiving element associated with first obtuse angle of the left photo-diode,
- $PD_{3L}$ is from the light receiving element associated with second obtuse angle of the left photo-diode,
- $PD_{4L}$ is from the light receiving element associated with second acute angle of the left photo-diode,
- $PD_{1R}$ is from the light receiving element associated with first acute angle of the right photo-diode,
- $PD_{2R}$ is from the light receiving element associated with first obtuse angle of the right photo-diode,
- $PD_{3R}$ is from the light receiving element associated with second obtuse angle of the right photo-diode, and
- $PD_{4R}$ is from the light receiving element associated with second acute angle of the right photo-diode.

16. The optical device of claim 11, wherein a focusing error signal FE(n) is computed by employing the following equation, $$FE(10)=(PD_{1L}-PD_{4L})+(PD_{1R}-PD_{4R}),$$

where
- $PD_{1L}$ is from the light receiving element associated with first acute angle of the left photo-diode,
- $PD_{4L}$ is from the light receiving element associated with second acute angle of the left photo-diode,
- $PD_{1R}$ is from the light receiving element associated with first acute angle of the right photo-diode, and
- $PD_{4R}$ is from the light receiving element associated with second acute angle of the right photo-diode.

17. An optical device, comprising:

an optical semiconductor element comprising a substrate defining a substrate surface, a laser disposed on the substrate surface, a semiconductor structure comprising a first reflection surface disposed at an incline to the substrate surface and a second reflection surface disposed at an incline to the substrate surface, wherein the first reflection surface opposes the laser, a first photo-diode disposed on the substrate surface, and a second photo-diode disposed at an incline to the substrate surface, wherein the first photo-diode is disposed between the first reflection surface and the second photo-diode so that the second reflection surface opposes the first photo-diode and the second photo-diode, wherein the semiconductor structure further comprises a third reflection surface disposed at an incline to the substrate surface and wherein the optical semiconductor element further comprises a third photo-diode disposed on the substrate surface, and a fourth photo-diode disposed at an incline to the substrate surface, wherein the third photo-diode is disposed between the third reflection surface and the fourth photo-diode so that the third reflection surface opposes the third photo-diode and the fourth photo-diode, and wherein a tracking error signal TE is computed by employing one equation from the group of equations consisting of $$TE=(PD_{1A}-PD_{1B}),$$

and $$TE=(PD_{2A}-PD_{2B}),$$

where
- $PD_{1A}$ is from the first photo-diode,
- $PD_{2A}$ is from the second photo-diode,
- $PD_{1B}$ is from the third photo-diode, and
- $PD_{2B}$ is from the fourth photo-diode.

18. The optical device of claim 17, wherein a focusing error signal FE is computed by employing the following equation, $$FE=(PD_{1A}-PD_{2A})+(PD_{1B}-PD_{2B}),$$

where
- $PD_{1A}$ is from the first photo-diode,
- $PD_{2A}$ is from the second photo-diode,
- $PD_{1B}$ is from the third photo-diode, and
- $PD_{2B}$ is from the fourth photo-diode.

* * * * *